US011956221B2

(12) United States Patent
Viswambharan et al.

(10) Patent No.: US 11,956,221 B2
(45) Date of Patent: Apr. 9, 2024

(54) ENCRYPTED DATA PACKET FORWARDING

(71) Applicant: Cisco Technology, Inc., San Jose, CA (US)

(72) Inventors: Rajesh Indira Viswambharan, Karnataka (IN); Ram Mohan Ravindranath, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 111 days.

(21) Appl. No.: 17/553,375

(22) Filed: Dec. 16, 2021

(65) Prior Publication Data
US 2023/0198964 A1    Jun. 22, 2023

(51) Int. Cl.
H04L 9/40  (2022.01)
(52) U.S. Cl.
CPC ...... H04L 63/0435 (2013.01); H04L 63/0236 (2013.01); H04L 63/0428 (2013.01); H04L 63/168 (2013.01); H04L 63/20 (2013.01)
(58) Field of Classification Search
CPC ............. H04L 63/0435; H04L 63/0236; H04L 63/0428; H04L 63/168; H04L 63/20
USPC ......................................................... 713/168
See application file for complete search history.

(56) References Cited

U.S. PATENT DOCUMENTS

| | | | | |
|---|---|---|---|---|
| 8,185,742 | B2 * | 5/2012 | Kim ..................... | H04N 21/435 713/168 |
| 8,387,129 | B2 * | 2/2013 | Rose ......................... | H04L 1/02 713/168 |
| 8,832,451 | B2 * | 9/2014 | Chung .................. | H04L 9/3236 713/168 |
| 11,443,323 | B2 * | 9/2022 | Wang ...................... | H04L 9/006 |
| 2003/0046387 | A1 * | 3/2003 | Oshima ............... | H04L 65/1101 709/224 |
| 2005/0198499 | A1 * | 9/2005 | Salapaka ............... | H04L 63/029 713/160 |
| 2019/0068491 | A1 * | 2/2019 | Tsirkin .................. | H04L 41/082 |
| 2019/0140983 | A1 | 5/2019 | Tu et al. | |
| 2019/0173841 | A1 | 6/2019 | Wang et al. | |
| 2019/0253398 | A1 * | 8/2019 | Sun ...................... | G06F 21/6263 |
| 2020/0143337 | A1 * | 5/2020 | Conroy ................ | G06Q 20/382 |
| 2020/0193017 | A1 | 6/2020 | Bannister et al. | |
| 2021/0019197 | A1 | 1/2021 | Tamir et al. | |
| 2021/0042427 | A1 * | 2/2021 | Wu ........................ | G06F 21/606 |

(Continued)

OTHER PUBLICATIONS

Nguyen Van Tu et al., "Building Hybrid Virtual Network Functions With Express Data Path" IFIP Digital Library, Published 2019, 9 pages.

(Continued)

Primary Examiner — Dant B Shaifer Harriman
(74) Attorney, Agent, or Firm — Lee & Hayes, P.C.

(57) ABSTRACT

A method of transmitting an encrypted data packet includes, with a processor, in response to receiving the encrypted data packet, executing an extended Berkeley packet filter (eBPF) application at an express data path (XDP) hook point located within a kernel space, determining whether the encrypted data packet is to be processed via a trusted application (TA) within a trusted execution environment (TEE) based on an analysis by the eBPF application, and identifying application intelligence data defining packet forwarding decisions based on a manner in which the encrypted data packet is processed.

20 Claims, 7 Drawing Sheets

(56) References Cited

U.S. PATENT DOCUMENTS

| | | | | |
|---|---|---|---|---|
| 2021/0243281 | A1* | 8/2021 | Duan | H04W 88/16 |
| 2022/0103530 | A1* | 3/2022 | Daly | H04L 63/166 |
| 2022/0116319 | A1* | 4/2022 | Dutta | H04L 45/64 |
| 2022/0210066 | A1* | 6/2022 | Khanna | H04L 45/74 |
| 2022/0311794 | A1* | 9/2022 | Maya | G06F 11/3065 |
| 2022/0337682 | A1* | 10/2022 | Waskiewicz, Jr. | H04L 41/24 |
| 2023/0016035 | A1* | 1/2023 | Mykytianskyi | H04L 63/1458 |
| 2023/0137255 | A1* | 5/2023 | Mestery | H04L 63/0478 |
| | | | | 713/151 |

OTHER PUBLICATIONS

Cilium, "Cilium 1.8: XDP Load Balancing, Cluster-wide Flow Visibility, Host Network Policy, Native GKE & Azure modes, Session Affinity, CRD-mode Scalability, Policy Audit mode, . . . ," Jun. 22, 2020, retrieved from <<https://cilium.io/blog/2020/06/22/cilium-18>> on Dec. 16, 2021, 41 pages.

Erickson, "Writing an XDP Network Filter With EBPF," retrieved from <<https://duo.com/labs/tech-notes/writing-an-xdp-network-filter-with-ebpf>> on Dec. 16, 2021, 7 pages.

Krahn, Robert et al: "TEEMon A continuous performance monitoring framework for TEEs", Proceedings of the ACM/SPEC International Conference on Performance Engineering, ACMPUB27, New York, NY, USA, Dec. 7, 2020 (Dec. 7, 2020), pp. 178-192, XP058563022, DOI: 10.1145/3423211.3425677 ISBN: 978-1-4503-8198-7 Sections 3-5.

Pantuza, Gustavo et al: "eQUIC Gateway: Maximizing QUIC Throughput using a Gateway Service based on eBPF + XDP", 2021 IEEE Symposium on Computers and Communications (ISCC), IEEE, Sep. 5, 2021 (Sep. 5, 2021), pp. 1-6, XP034048095, DOI: 10.1109/ISCC53001.2021.9631262 [retrieved on Nov. 30, 2021] Sections I-VI, IX.

The PCT Search Report and Written Opinion dated Apr. 11, 2023 for PCT application No. PCT/US2022/052663, 16 pages.

Hoiland-Jorgensen et al. "The Express Data Path: Fast Programmable Packet Processing in the Operating System Kernel" AMC Digital Library, Dec. 4, 2018, 13 pages.

* cited by examiner

ENCRYPTED DATA PACKET FORWARDING

TECHNICAL FIELD

The present disclosure relates generally to transmission and processing of data packets. Specifically, the present disclosure relates to systems and methods for transmitting and processing encrypted data packets in a secure manner via express data path (xDP) layer access and through execution of an extended Berkeley packet filter (eBPF) application to identify application intelligence data defining packet forwarding decisions.

BACKGROUND

Computer networking is ubiquitous and serves to allow for data to be transmitted from a first computing device within the network to a second computing device communicatively coupled to the first computing device. In many instances, the data transmitted within a computing network may include encrypted data packets that are also latency sensitive in that the encrypted data packets are required to be delivered as quickly as possible such as in real-time (RT) communications. An issue may arise when applications are required to share encryption keys of the header or payload of the encrypted data packets in order to decrypt the encrypted data packets but are not allowed to for security purposes. Although a transport later security (TLS) protocol may be addressed at a kernel layer of a computing device tasked with processing the encrypted data packets, adoption of such processes takes significant processing time and a majority of applications may control such processing in the user space. This may lead to a situation where the eBPF application lacks a required application intelligence to act on forwarding decision as to where to forward the encrypted data packets. Since this processing takes considerable time and computing resources, the ability to provide for the forwarding of RT communications in a timely manner becomes nearly impossible.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
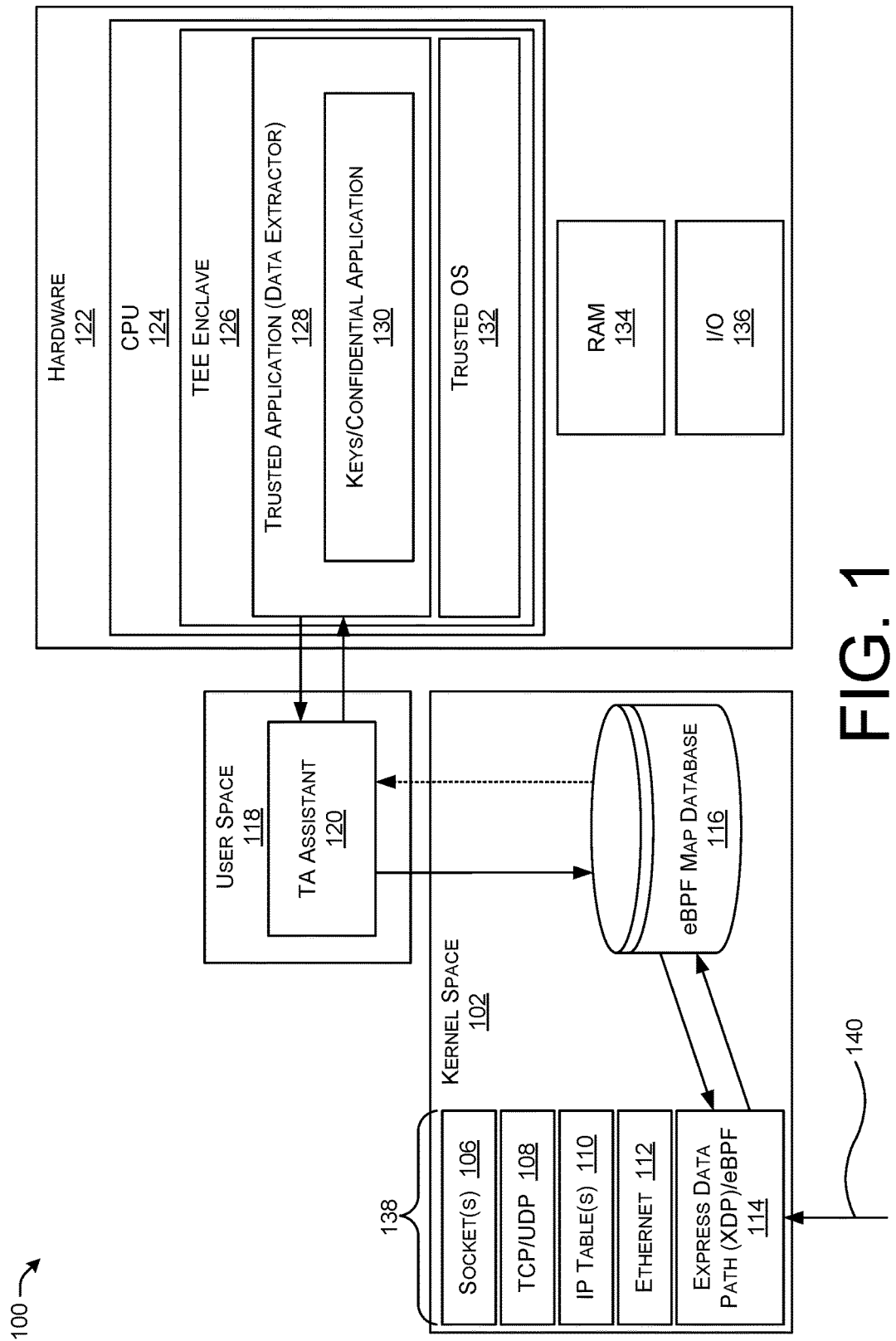
FIG. 1 illustrates a system-architecture diagram of a TEE infrastructure utilizing an XDP layer to access eBPF kernel hooks in order to glean intelligence regarding data packet forwarding decisions, according to an example of the principles described herein.

Examples described herein provide a method of transmitting an encrypted data packet. The method may include, with a processor, in response to receiving the encrypted data packet, executing an extended Berkeley packet filter (eBPF) application at an express data path (XDP) hook point located within a kernel space, determining whether the encrypted data packet is to be processed via a trusted application (TA) within a trusted execution environment (TEE) based on an analysis by the eBPF application, and identifying application intelligence data defining packet forwarding decisions based on a manner in which the encrypted data packet is processed.

The method may further include, in response to a determination that filtering criteria indicates additional processing via a trusted application (TA), updating an eBPF map database. The method may further include, with a TA handling application, monitoring an eBPF application for an update to the eBPF map, selecting relevant encrypted data within the encrypted data packet, and transmitting the relevant encrypted data to the TA. Further, the method may include, with the TA, processing the relevant encrypted data to create processed relevant encrypted data, and transmitting the processed relevant encrypted data to the TA handling application. The method may further include invoking a system call to update the eBPF map database based on the processed relevant encrypted data.

The eBPF map database may include a map type including a data structure identifying an application type and an encrypted portion of the encrypted data packet. The determination that the filtering criteria indicates additional processing by the TA may be based at least in part on a processing of a number of initial packets to identify in instances where the TA has been pre-installed, may be based at least in part on whether the initial packets have been transmitted to the TA handling application which triggers the updating of the eBPF map database, or combinations thereof.

The encrypted data packet may include QUIC transfer protocol enabled traffic including an en4-tupled identifier and encoded ConnectionID. The encrypted data packet may include real-time (RT) media traffic including real-time protocol (RTP) header data including a synchronization source identifier (SSRC), a plurality of multiplexed media channels transmitted via a quadruple, and combinations thereof.

The method may further include handling subsequent encrypted data packets based on an updated eBPF map database based on the updating of the eBPF map database. The method may further include receiving the encrypted data packet at the processor to which an interrupt request (IRQ) of a network interface controller (NIC) receive (RX) queue is directed, and executing the eBPF application to access the TA directly from the kernel space.

The method may further include determining if the processor is TEE-enabled, and, based at least in part on the processor not being TEE-enabled, executing the eBPF application to transmit the encrypted data packet to a TEE-enabled processor. The eBPF application may include an inventory of a TA installation status of a plurality of processors.

Examples described herein also provide a computing device. The computing device may include a processor, and a non-transitory computer-readable media storing instructions that, when executed by the processor, causes the processor to perform operations including, in response to receiving the encrypted data packet, executing an extended Berkeley packet filter (eBPF) application at an express data path (XDP) hook point located within a kernel space, determining whether the encrypted data packet is to be processed via a trusted application (TA) within a trusted execution environment (TEE) based on an analysis by the eBPF application, and identifying application intelligence data defining packet forwarding decisions based on a manner in which the encrypted data packet is processed.

The operations may further include, in response to a determination that filtering criteria indicates additional processing via a trusted application (TA), updating an eBPF map database. The operations further include, with a TA handling application, monitoring an eBPF application for an update to the eBPF map, selecting relevant encrypted data within the encrypted data packet, and transmitting the relevant encrypted data to the TA. The method may further include, with the TA, processing the relevant encrypted data to create processed relevant encrypted data, and transmitting the processed relevant encrypted data to the TA handling application. The operations may further include invoking a system call to update the eBPF map database based on the processed relevant encrypted data.

The eBPF map database may include a map type including a data structure identifying an application type and an encrypted portion of the encrypted data packet. The determination that the filtering criteria indicates additional processing by the TA is based at least in part on a processing of a number of initial packets to identify in instances where the TA has been pre-installed, is based at least in part on whether the initial packets have been transmitted to the TA handling application which triggers the updating of the eBPF map database, or combinations thereof.

The encrypted data packet may include QUIC transfer protocol enabled traffic including an en4-tupled identifier and encoded ConnectionID. The encrypted data packet may include real-time (RT) media traffic including real-time protocol (RTP) header data including a synchronization source identifier (SSRC), a plurality of multiplexed media channels transmitted via a quadruple, and combinations thereof.

The operations may further include handling subsequent encrypted data packets based on an updated eBPF map database based on the updating of the eBPF map database. The operations may further include receiving the encrypted data packet at the processor to which an interrupt request (IRQ) of a network interface controller (NIC) receive (RX) queue is directed, and executing the eBPF application to access the TA directly from the kernel space.

The operations may further include determining if the processor is TEE-enabled, and based at least in part on the processor not being TEE-enabled, executing the eBPF application to transmit the encrypted data packet to a TEE-enabled processor. The eBPF application may include an inventory of a TA installation status of a plurality of processors.

Additionally, the techniques described in this disclosure may be performed as a method and/or by a system having non-transitory computer-readable media storing computer-executable instructions that, when executed by one or more processors, performs the techniques described above.

As mentioned above, the transmission and processing of RT communications including encrypted data packets may prove difficult. However, the present systems and methods may employ extended Berkeley packet filter (eBPF) processing as part of a solution to ensure effective forwarding of the encrypted data packets. eBPF is a powerful in-kernel byte4-tuple engine which allows full programmability on inserting hooks in all logical points of a kernel stack in order to handle the data packets. eBPF is available on Linux and Microsoft Windows-based operating systems. Further, eBPF provides a raw interface to data link layers, permitting raw link-layer packets to be sent and received. Further, if a driver for the network interface supports promiscuous mode, eBPF allows the interface to be put into promiscuous mode so that all data packets on the network may be received including data packets destined to other hosts. A Linux kernel may include an eBPF virtual machine with ten 64-bit registers that may be used for non-networking purposes, such as for attaching eBPF programs to various tracepoints within the kernel. eBPF may include filters that may be attached to sockets and traffic control classifiers for the ingress and egress networking data path.

The ability of eBPF processing to allow full programmability on inserting the hooks in all logical points of a kernel stack to handle the networking packets further allows the eBPF processing to interpret system call events and take any logical action. A number of use cases such as traceability, observability, load balancing, etc. may be solved via the interpretation of call events of eBPF processing. eBPF processing may be used in tandem with eXpress Data Path (XDP) to provide a high performance data path in, for example, the Linux kernel for processing data packets as they are transmitted to a network interface controller (NIC) which may be useful for low latency applications like user datagram protocol (UDP)-based real time media as well as some Internet of things (IoT) and 5G telecommunications standard use cases.

However, eBPF/XDP programs may be able to act only on transport headers up to the transport layer (e.g., as to transmission control protocol (TCP) or UDP). Although the ability of eBPF/XDP programs to act up to L4 may be sufficient if a user is seeking only transport level treatment. However in many use-cases, a user may need to access the application layer (Layer 7 or L7) headers as well in order to be able to classify and route data packets properly.

Some use cases may require snooping into an encrypted portion of the headers. However, applications may not share the keys of the header or the payload to decrypt an encrypted data packet for security reasons. The present systems and methods solve the above mentioned issues, as well as solve associated issues that arise in two main networking use cases which demanded the aforementioned application awareness support: real-time communications (e.g., teleconferencing) and use of QUIC transport protocol supporting multiplexing and end-to-end (e2e) encryption.

In the first use case of real-time communications and, specifically, telecommunications such as video conferencing, many video conferencing solutions require that all packets for a given media type be routed to the same pod for media routing. This may be referred to as "stickiness" where every user communicates with the same pod because od the authentication mechanisms provided by a backend system to create a sticky session. The telecommunications data may include audio data, video data, presentation video data, application data channels such as binary floor control protocol (BFCP) data, iX channel protocol data, and other data. These data require all data packets for a given media type to be transmitted to the same Kubernetes pod in a cloud computing environment that supports the teleconferencing services used here as an example. This is to allow processing of packet headers, apply various services such as mixing based on real-time transport protocol (RTP) headers, transcoding from a first 4-tuplec to a second 4-tuplec if necessary, transcription, and other services and processing. In order to successfully perform these services, all data packets of a media type have to be transmitted and processed via the same, respective Kubernetes media pod instances.

By way of an example, a teleconferencing instance may be hosted on a cloud computing environment executed via a Kubernetes container-orchestration system. The cloud computing environment may include any collection of computer system resources including data storage (e.g., cloud storage) and computing power (e.g., processing resources) distributed over a number of data centers. The Kubernetes container-orchestration system may include any number of primitives that collectively provide mechanisms that deploy, maintain, and scale applications based on processor, memory, or custom metrics. Extensibility provided by the Kubernetes system may be provided via a Kubernetes application program interface (API) utilized by internal components of the various computing devices described herein as well as extensions and containers that run on Kubernetes. The Kubernetes platform exerts its control over compute and storage resources by defining resources as "cluster objects," which can then be managed as such.

A number of Kubernetes clusters may be included with a number of replica sets. The replica sets may maintain a set of pods. The pods include any scheduling unit and may include a grouping of containerized components. A pod may include one or more container that are guaranteed to be co-located on the same node. Each pod in Kubernetes may be assigned a unique internet protocol (IP) address within the cluster which allows applications to use ports without the risk of conflict. Within the pod, all containers may reference each other on localhost, but a container within one pod may be unable to directly address another container within another pod. Thus, a first container within a first pod seeking to communicate with a second container in a second pod may utilize a Pod IP Address. The pods described herein may define a volume, such as a local disk directory or a network disk, and expose it to the containers in the pod. The pods may be managed manually through the Kubernetes API, or their management may be delegated to a controller.

Thus, this example of a teleconferencing instance hosted on a cloud computing environment executed via a Kubernetes container-orchestration system may include components that switch media and provide various media services (e.g., Media as a Service (MaaS)). Thus, the pods may manage audio, video, application data (e.g., file sharing, video sharing, other data channels), and their types of media services. Participants of the teleconferencing instance may receive and/or transmit their media with a conference switch module or ingress controller in the cloud computing environment. In one example, the media switch may include an ingress pod that will listen on public IP and receive all the media channels. Further, the media switch may inspect the headers, ports, etc. of the received data packets and forward the data packets to corresponding pods behind the ingress. For example, all audio data packets may be forwarded to an audio service pod, video data packets may be forwarded to a video service pod, etc. In one example, teleconferencing implementations that seek to reduce the Network address translation (NAT) and/or firewall (FW) maintenance may also use a single UDP 4-tuple on which each device described herein may send and receive the media channels they respectively negotiates for the teleconferencing instance. The teleconferencing implementations in the cloud computing environment may utilize multiplexing technologies like BUNDLE to send various media streams in a single UDP channel as described in request for comments (RFQ) 8843 of the Internet Engineering Task Force (IETF) titled, "Negotiating Media Multiplexing Using the Session Description Protocol (SDP)", the entirety of which is incorporated herein by reference.

Within the Kubernetes container-orchestration system described herein, by way of example, may include a media stack. A media ingress switch may inspect RTP headers for audio and/or video streams, for example, that utilize RTP as a transport protocol. Further, the media ingress switch may inspect a UDP payload including an initial few bytes for other types of data such as, for example, application sharing (BFCP data, iX channel protocol data, etc.). The media ingress switch may further forward the data packets by demuxing the data packets. Further, control packets such as, for example, session traversal utilities for network address translation (NAT) (STUN) protocol, interactive connectivity establishment (ICE) protocol may be demuxed and sent to a control pod by the media ingress switch. Some implementations may require a high scale ingress as it may be required to receive all the media channels (e.g., audio data channel(s), video data channel(s), application data channel(s), etc.) and perform the demultiplexing and classification in the application layer.

Using data packet lookup and processing 4-tuple at an XDP to lookup the data packet headers and forward the media data to corresponding pods within the Kubernetes container-orchestration system may ensure the media ingress switch can scale the system. However, some challenges associated with this approach include the fact that media data packet headers may be protected in most data flows. For examples audio and/or video streams using RTP as transport may include RTP header extensions either encrypted using a hop-by-hop (hbh) key authentication and associated protocol(s) and the RTP header may be integrity protected using the same hbh key authentication. Any byte 4-tuple running on XDP inspecting RTP headers may not have enough context to validate these encrypted or integrity protected packets without being sure the data packet is safe.

Further, another challenge associated with using data packet lookup and processing 4-tuple at an XDP to lookup the data packet headers and forward the media data to corresponding pods within the Kubernetes container-orchestration system may be related to when BUNDLE is used to mux various media channels such as audio data, video data, and application data on the same 4-tuple. In this situation, it may be challenging to have a XDP byte 4-tuple perform the inspection. Any 4-tuple that runs at an XDP layer may be required to be intelligent enough to understand what packets on the muxed channel should be forwarded and to which of a plurality of pods the muxed channel should be forwarded.

Another use case described herein by way of example includes the utilization of QUIC transport protocol supporting multiplexing. QUIC is a general-purpose transport layer network protocol improves performance of connection-oriented web applications that utilize TCP by establishing a number of multiplexed connections between two endpoints using UDP. QUIC functions with hypertext transfer protocol (HTTP)/2 and HTTP/3. QUIC transport protocol is designed such that it inherently supports multiplexing and e2e encryption. The QUIC header exposes a connection identifier (e.g., ConnectionID) in a public header which does not have any additional information including private information or other information a user does not wish others to view. The use of ConnectionID in a public header further prevents linkability of connections across deliberate address migrations by providing protected communications between a client device and a server. However, avoiding linkability of migrated connections via the use of ConnectionID creates issues for load-balancing intermediaries within the computer environment. In one example, the required information such as a Server ID in the ConnectionID may be provided so that a load balancing device may de4-tuple and ensure the session affinity. As the ConnectionID is en4-tupled, until required key is available with XDP programs at a NIC driver layer, it cannot get any useful information out of this ConnectionID tuple alone unless it has application awareness.

Therefore, the present systems and methods provide a technique by which the XDP/eBFP layer may be made more application aware and may intelligently forward encrypted packets after initial packets are processed via an application layer (e.g., a user space container). An eBPF application obtains the intelligence to forward the encrypted data packets from a TEE application without compromising security of the encrypted data packet. The present systems and methods provide a mechanism for hosting sensitive keys or an associated confidential application for processing the encrypted portion of the data packet in the TEE infrastructure wherein an XDP layer accesses through a number of eBPF kernel hooks and gleans the application awareness and intelligence to decide on the data packet forwarding decisions.

Example Embodiments

Turning now to the figures, FIG. 1 illustrates a system-architecture diagram of a trusted execution environment (TEE) infrastructure 100 utilizing an XDP layer including an XDP/eBPF application 114 to access eBPF kernel hooks in order to glean intelligence regarding data packet forwarding decisions, according to an example of the principles described herein. The TEE infrastructure 100 may be implemented in any computing environment including, for example, a cloud computing environment, a virtual machine computing environment, a physical computing environment, and combinations thereof. Any number of devices may be used to effectuate the functionality of the TEE infrastructure 100 including, for example, servers, routers, switches, client computing devices, relays, repeaters, en4-tupler/receiver/transmitters (ERTs), appliances, personal computers (e.g., desktop computers, laptop computers, etc.), mobile devices (e.g., smartphones, tablets, personal digital assistants (PDAs), electronic reader devices, etc.), wearable computers (e.g., smart watches, optical head-mounted displays (OHMDs), etc.), access points, gateway computing devices, a myriad of other network computing devices, and combinations thereof.

TEE infrastructure 100 may include a kernel space 102, a user space 118, and hardware 112. The kernel space 102 may be any portion of memory (e.g., virtual memory) segregated from the user space 118. The kernel space may be reserved for running a privileged operating system kernel, kernel extensions, and device drivers. The user space 118 may include any portion of memory (e.g., virtual memory) segregated from the kernel space 102. The user space 118 may include the memory area where application software and some drivers may be executed. The applications executed in the user space 118 are not permitted by a processor to address kernel memory in order to preventing the application from damaging the running kernel.

The kernel of the kernel space 102 may include any computer program at the core of the operating system (OS) executed within the TEE infrastructure 100, and has complete control over everything in the TEE infrastructure 100. The kernel, as a portion of the OS, is always resident in memory and facilitates interactions between hardware and software components within the TEE infrastructure 100. The kernel controls all hardware resources including, for example, input/output (I/O), memory, and cryptography, among other resources via device drivers. Further, the kernel arbitrates conflicts between processes concerning such resources and optimizes the utilization of common resources including processor(s) (e.g. a CPU) usage, cache usage, file systems, and network sockets. The kernel may handle portions of a startup process as well as memory, peripherals, and I/O requests from software, translating them into data-processing instructions for the processor(s). Further, the kernel performs a number of tasks including, for example, running processes, managing hardware devices, and handling interrupts in the protected kernel space. In contrast, application programs such as teleconferencing programs, web browsers, word processors, or audio or video players are executed within the user space 118 within the separate area of the memory. This separation prevents user data and kernel data from interfering with each other and causing instability and slowness, as well as preventing malfunctioning applications from affecting other applications or crashing the entire operating system. The interface of the kernel is a low-level abstraction layer so that when a process requests a service from the kernel, it must invoke a system call. The kernel takes responsibility for deciding at any time which of the many running programs or applications executed in the user space 118 should be allocated to the processor(s).

The kernel space 102 may include a network stack 138 including, for example and in terms of the Linux kernel network stack, a socket layer including a number of network socket(s) 106, a transport layer including any transport protocols such as TCP and/or UDP 108, an internet layer including a number of IP tables 110, a link layer including, for example, an ethernet network connection, and an XDP layer including an XDP/eBPF application 114 and any eBPF functionality as described herein.

The network socket(s) 106 included with the socket layer may include any software structure within a network node of a computer network that serves as an endpoint for sending and receiving data across the network. The structure and properties of a network socket 106 are defined by an API for the networking architecture and the TEE infrastructure 100. The network socket(s) 106 may be created only during the lifetime of a process of an application running in the node. In one example, the network socket(s) 106 may be externally identified to other hosts by their respective socket addresses including a triad of transport protocol, IP address, and port number.

The transport layer of the Linux kernel may include any conceptual division of methods in the layered architecture of protocols in the network stack 138. The protocols of the transport layer provide host-to-host communication services for applications, and provides services such as, for example, connection-oriented communication, reliability, flow control, and multiplexing. The protocols utilized at the transport layer may include TCP and/or UDP 108 as depicted in FIG.

1, but may also include, for example, datagram congestion control protocol (DCCP), the stream control transmission protocol (SCTP), and the resource reservation protocol (RSVP), among others.

The internet layer may include any number of internetworking methods, protocols, and specifications in the Internet protocol suite that are used to transport network packets from an originating host device across network boundaries, and, if necessary, to a destination host device specified by an IP address. The number of IP table(s) 110 may include any user-space utility program that allows a system administrator to configure IP packet filter rules of the Linux kernel firewall. The filters may be organized in different tables that contain chains of rules for how to treat network traffic packets. Different kernel modules and programs may be used for different protocols such as, for example, iptables that applies to IPv4, ip6tables that applies to IPv6, arptables that applies to ARP, and ebtables that applies to Ethernet frames. Iptables allows a system administrator to define tables containing chains of rules for the treatment of data packets within the TEE infrastructure 100. Each table may be associated with a different kind of data packet processing. The data packets may be processed by sequentially traversing the rules in chains and a rule in a chain may cause a goto or jump to another chain.

The link layer may include any group of methods and communications protocols confined to the link that a host computing device is physically connected to. The link includes the physical and logical network component used to interconnect hosts or nodes in the network and a link protocol is a suite of methods and standards that operate only between adjacent network nodes of a network segment. The link layer may utilize local area network protocols such as Ethernet and other IEEE 802 networks (e.g. Wi-Fi), and framing protocols such as point-to-point protocol (PPP).

XDP/eBPF application 114 is an eBPF-based high performance data path merged in the Linux kernel. The associated XDP layer provides for the addition of an early hook in the RX path of the network stack 138 and Linux kernel. The XDP layer also allows an eBPF program decide the fate of the data packet. A hook may include an earliest point possible within a networking driver located at the XDP layer and triggers a run of an eBPF program upon packet reception. This achieves the best possible packet processing performance since the program runs directly on the data packet before any other processing may occur. The hook provides for the running of filtering programs that drop malicious or unexpected traffic, as well as allows for the forwarding of data packets based on the present systems and methods. Thus, the hook is placed in a NIC driver just after interrupt processing and before any memory allocation needed by the network stack 138 because memory allocation can be an expensive operation. As mentioned above, XDP/eBPF application 114 requires support in the NIC driver. However, as not all drivers support XDP/eBPF application 114, XDP/eBPF application 114 is able to fallback to a generic implementation which performs eBPF processing in the network stack 138. XDP/eBPF application 114 may include infrastructure to offload the eBPF program to a network interface controller which supports it, reducing CPU load.

eBPF is an instruction set and an execution environment inside the Linux kernel and within the kernel space 102. eBPF enables modification, interaction and kernel programmability at runtime, and may be used to program the XDP/eBPF application 114 as a kernel network layer that processes packets closer to the NIC for fast packet processing. Use cases for eBPF may include, for example, teleconference media type processing, multiplexing via QUIC transport protocol, network monitoring, network traffic manipulation, load balancing, and system profiling, among other use cases.

An eBPF map database 116 may also be included within the kernel space 102. The eBPF map database 116 may include any number of eBPF map(s) that may be monitored by, for example, the TA assistant 120, for a number of updates made to the eBPF map database 116. The existence of the eBPF map database 116 allows data exchange between the user space 118 and associated applications and kernel space 102 and associate applications. The present systems and methods may use, for example, eBPF HashMaps (e.g., BPF_MAP_TYPE_HASH) as a map type (e.g., map_type). The eBPF HashMaps may include key/value pairs. In one example, updates to the eBPF HashMap elements may be performed automatically. From the kernel space 102, eBPF HashMaps may be accessible via eBPF helper functions callable from within a number of eBPF programs executed in the kernel space 102 and in association with the XDP layer and the XDP/eBPF application 114. Further, the eBPF helper functions provide an interface to the maps that closely mirrors interfaces associated with the user space 118. The map lookup and update operations issued through the eBPF system call and the eBPF helper functions may end up calling the same kernel space 102 functions. These functions may, in turn, call specialized functions based on the type of map being acted on. The eBPF HashMaps may include a value portion including a custom data structure to capture the application type and an encrypted portion of the encrypted data packet.

The TEE infrastructure 100 may further include a TA assistant 120 as mentioned above within the user space 118. The TA assistant 120 may process the eBPF data structure of an encrypted data packet, identify the underlying application type, and extract an encrypted portion to be processed from the eBPF HashMap. The TA assistant 120 may then invoke an appropriate trusted application (TA) in a TEE enclave 126 located on the hardware 122 with filtered data including the extracted, encrypted portion of the data packet to be processed.

The TEE infrastructure 100 may further include hardware 122 including a CPU 124 or other processing device(s), random access memory (RAM) 134, and a number of I/O device(s) 136. The CPU 124 may include the TEE enclave 126. The TEE enclave 126 may include any set of security-related instruction 4-tuples that are built into the CPU 124 to allow user-level and/or operating system 4-tuple to define private regions of memory, called enclaves, whose contents are protected and unable to be either read or saved by any process outside the enclave itself, including processes running at higher privilege levels. In one example, the TEE enclave 126 may be supported by Software Guard Extensions (SGX) security-related instruction 4-tuples developed and distributed by Intel Corporation.

The TEE enclave 126 may include a TA 128 acting, in the examples described herein, as a data extractor to extract and process the encrypted data packet. The TA 128 may include any application running in the TEE enclave 126 and the TEE infrastructure 100 that has access to the full power of the CPU 124, peripherals, and memory of the computing device(s) in which the TEE infrastructure 100 is implemented. Further, in one example, the TA 128 may enjoy the hardware isolation provided by the TEE enclave 126 and TEE infrastructure 100 to protect the TA 128 from any user-installed applications running in a main operating system. Further, software and cryptographic isolation inside the TEE enclave 126 and TEE infrastructure 100 protects the TA 128 contained within from other applications including other TAs within the TEE enclave 126 and TEE infrastructure 100.

The TA 128 may further host a number of sensitive keys and/or an associated confidential application 130 for processing the encrypted data packets, and, specifically, an encrypted portion of the data packet in the TEE infrastructure which the XDP layer accesses through eBPF kernel hooks within the kernel space 102. Through these methods, the present systems and methods may glean the application awareness or intelligence to decide on the packet forwarding decisions for future data packets arriving at the TEE infrastructure 100.

Further, a trusted OS (TOS) 132 may also be included within the TEE enclave 126. The TOS 132 may include any OS that provides multilevel security and evidence of correctness to meet a particular set of organizational requirements such as, for example, memory protection, file protection, object access control, user authentication, I/O device access control, load balancing, security policy enforcement, and other functions in a secure manner.

At 140, the encrypted data packets that are to be processed by the TEE infrastructure 100 may be input to the network stack 138. The TA 128 for handling the encrypted data packet or a portion of the encrypted data packet may be installed in the TEE enclave 126 of the CPU 124 within the TEE infrastructure 100. The TA 128 may be the keys and/or confidential application 130 to process the incoming encrypted data packet. In one example, the application/flow specific keys may be added into TEE enclave 126 of the TEE infrastructure 100 to process the encrypted data packets in a dynamic manner. A number of eBPF programs may be executed at the network stack 138 to process the encrypted data packets as the encrypted data packets are added to the appropriate XDP hook. In some examples described herein, the TA assistant 120 may monitor the eBPF map database 116 for any updates thereto. The eBPF map database 116 allows data exchange between programs executed within the user space 118 and applications executed within the kernel space 102. The present systems and methods utilize the eBPF HashMaps as a map type with the value part of the encrypted data packet including a custom data structure to capture the application type and encrypted portion of the encrypted data packet. The TA assistant 120 may process the eBPF data structure, identify the underlying application type and extract the encrypted portion of the encrypted data packet to be processed from the eBPF map database 116 and invoke the appropriate TA 128 in the TEE enclave 126 with the filtered data.

In one example, the encrypted data packet may be processed by the TA 128 via the TA assistant 120 within the user space 118. In one example, the encrypted data packet may be processed by avoiding the TA assistant 120 within the user space 118 and, instead, directly invoking the TA 128 from the kernel space 102. These two examples are described in more detail herein.

As to the first example where the encrypted data packet is processed by the TA 128 via the TA assistant 120 within the user space 118, when the encrypted data packet is received at 140, the eBPF application at the gets triggered at the XDP layer including a number of eBPF kernel hooks. Filtering criteria may be applied by the eBPF application to the encrypted data packet to identify an encrypted data packet that is to be further processes via the TA 128. If the filtering criteria identifies the encrypted data packet to be further processed via the TA 128, the eBPF application may update the eBPF map database 116 with all relevant information including, for example, a map type including a data structure identifying an application type and an encrypted portion of the encrypted data packet. The identification of interesting traffic may be based at least in part on, for example, a processing of a number of initial packets to identify in instances where the TA has been pre-installed, is based at least in part on whether the initial packets have been transmitted to the TA handling application which triggers the updating of the eBPF map database, and combinations thereof.

Use cases associated with the present systems and methods may include situations where the data packet or traffic received at the TEE infrastructure 100 may be QUIC traffic with en4-tupled ConnectionID which is to be processed for load balancing purposes. The en4-tupled ConnectionID may be transmitted to the TA 128 for processing and exposing the target server details for load balancing.

Another use case may include teleconferencing where meeting media traffic including media-related data packets are processed. In this use case, traffic that is e2e encrypted and includes, for example, RTP headers also are either encrypted or integrity protected using hop-by-hop (hbh) media keys. In this use case, the RTP header data may include a synchronization source identifier (SSRC) with a header field in the RTP that identifies the stream may be provided to the TA 128 to validate integrity or security and also assist in mapping the SSRC to a pod within the Kubernetes pod. The TA 128 may decrypt the header extensions (if the header extensions are encrypted) or validate integrity, and lookup the SSRC to find the target server details. In the teleconferencing use case, when media channels are muxed (multiplexed) using techniques such as, for example, BUNDLE, to process all media channels including the audio channel, the video channel, one or more application data channels, among other channels. The muxed channels may be sent over the same 4-tuple. The eBPF application executed at the XDP/eBPF application 114 may be triggered that will again use the TA 128 to first validate the header and decrypt the header if need, and identify the target server to which the encrypted data packet is to be forwarded.

Continuing with the first example where the encrypted data packet is processed by the TA 128 via the TA assistant 120 within the user space 118, the TA assistant 120 may monitor the eBPF map database 116 and select relevant data from the eBPF map database 116 and the encrypted data packets, and invoke the appropriate TA 128 by passing the relevant encrypted data to the TA 128. The TA 128 may decrypt the header or processes the header info further and transmit the result back to the TA assistant 120 to be used as data packet handling information for future data packets. The TA assistant 120 may update the eBPF map database 116 with the result by invoking an eBPF SYSCALL. Thus, when the XDP/eBPF application 114 receives an encrypted data packet, the XDP/eBPF application 114 may select the updated information within the eBPF map database 116, and process or handle the encrypted data packet based on how the previous encrypted data packet was handled. Thus, as more and more application intelligence data defining packet forwarding decisions is obtained from previous processing decisions, for many of the encrypted data packets received at the XDP/eBPF application 114 it may not be required to process every one anew since that information is provided within the XDP/eBPF application 114. If an initial few encrypted data packets are analyzed to determine the flow, then the required treatment will be applied to subsequent encrypted data packets based thereon. The eBPF map database 116 may also act as a medium for storing state information and, in this manner, may be used as an interim caching layer for the flow data.

As mentioned above, the example of FIG. 1 may be embodied in a Kubernetes container-orchestration system. In this example, the TEE infrastructure 100 may be implemented within the Kubernetes container-orchestration system where at least a portion of the kernel space 102, the user space 118, and the hardware 122 is included within the Kubernetes container-orchestration system. In one example, the Kubernetes container-orchestration system utilized by the TEE infrastructure 100 may include the Kubernetes container-orchestration system described herein in connection with FIG. 2.

Figure 2:
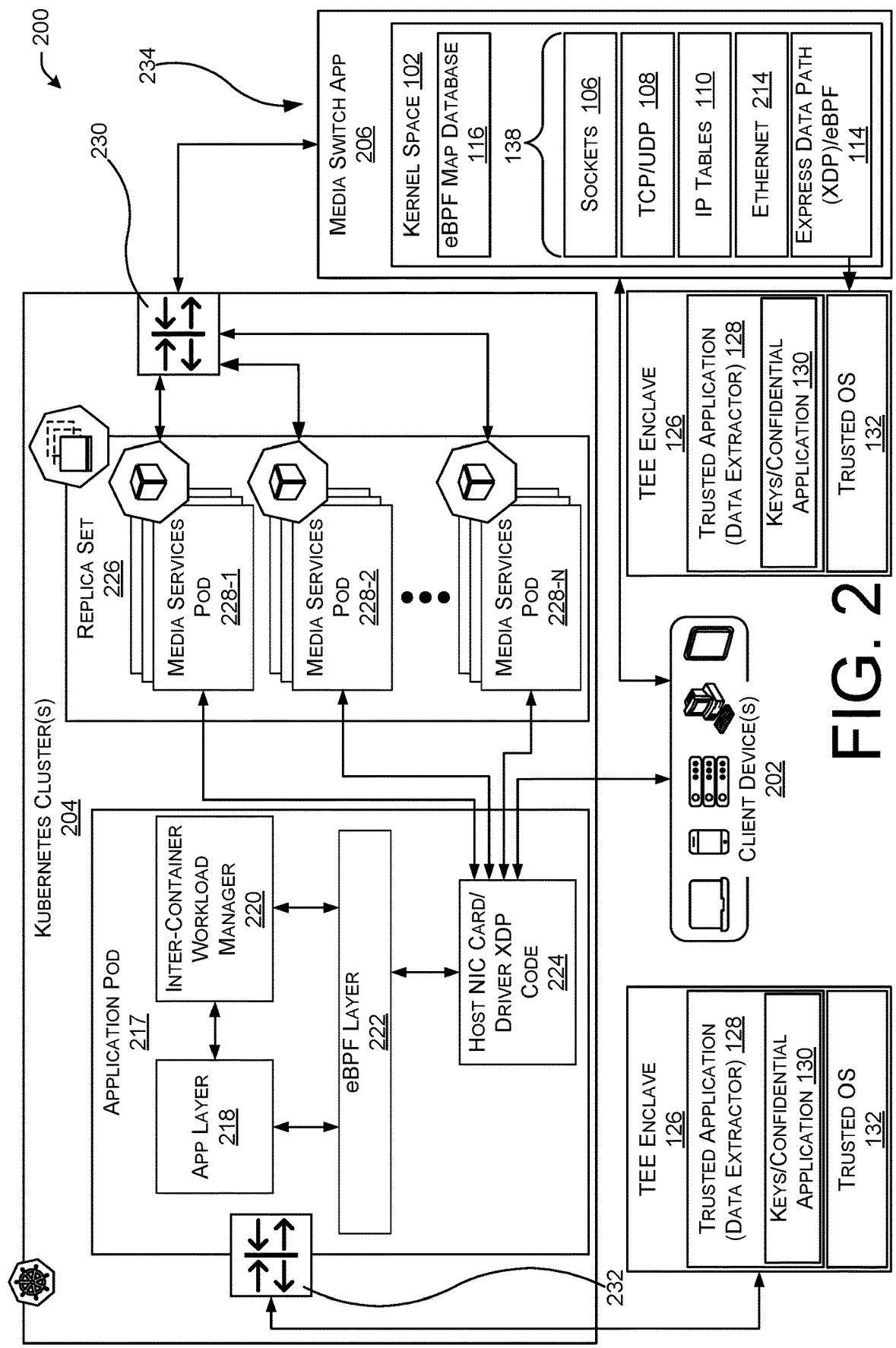
FIG. 2 is a system-architecture diagram of a computing environment for intelligently forwarding data packets via XDP.

Scenario 1:

As to the example where the encrypted data packet may be processed by avoiding the TA assistant 120 within the user space 118 and, instead, the TA 128 is directly invoked from the kernel space 102, this example may be described in connection with FIG. 2. Thus, having described the TEE infrastructure 100 of FIG. 1, FIG. 2 is a system-architecture diagram of a computing environment 200 for intelligently forwarding data packets via XDP 216 and describes a first scenario. In the example of FIG. 2, the TA 128 may be invoked directly from the kernel space 102 including the network stack 138, avoiding the TA assistant 120 depicted in FIG. 1 to invoke the TEE enclave 126. The TA 128 may be a mostly stateless application that is acted upon by the data within the encrypted data packet. In encrypted data packet processing use cases, the eBPF application executed at the XDP/eBPF application 114 of the XDP layer may directly access the TA 128. This may be particularly effective when delay sensitive applications can leverage this approach to avoid involving the TEE enclave 126 through user space. Many computing systems may include multiple processing systems and may support heterogeneous system architectures. In some computing systems, the processors may be both TEE-enabled and non-TEE-enabled. The TA(s) 128 included within the computing environment 200 may be loaded in TEE-specific hardware as indicated by the TEE enclaves 126 depicted in FIGS. 1 and 2. The encrypted data packet may be received on a CPU referred to as the "receiving CPU" to which an interrupt request (IRQ) of a network interface controller (NIC) receive (RX) queue is steered. This receiving CPU is the CPU that initially receives the encrypted data packet, and it is at this point where the XDP program of the XDP/eBPF application 114 is executed for initial packet filtering.

In one example, where the receiving CPU is not TEE-enabled or does not host a required TA 128, then the eBPF application may be executed to redirect the encrypted data packet to a remote TEE-enabled CPU for further processing. In one example, the eBPF application executed at the XDP/eBPF application 114 may include intelligence or data stored in a data storage device that provides the computing environment 200 with an inventory of CPUs, the CPUs respective TA installation status and/or the CPUs TEE-enabled status. This allows the XDP/eBPF application 114 to redirect the encrypted data packet for processing at one of the TEE-enabled and/or TA 128 enabled CPUs when a first CPU is not TEE-enabled and/or is not TA 128 enabled.

The example of avoiding the TA assistant 120 within the user space 118 and, instead, directly invoking the TA 128 from the kernel space 102 as depicted in FIG. 2 may be used in a number of use cases. A first use case may include application of low-latency applications such as, for example, real time media applications that include audio channels, video channels, presentation video channels, application data channels such as a binary floor control protocol (BFCP) channel and an iX channel, and other channels and their associated protocols and data. These real-time media applications may include, for example, a teleconferencing application. An example of a teleconferencing application may include WEBEX teleconferencing application developed and distributed by Cisco Systems, Inc.

In the real-time media application example, a first scenario may include an example where a number of client device(s) 202 acting as an endpoint does not perform multiplexing and uses separate 4-tuples for each media channel sent by the real-time media application. The payload of the encrypted data packets may include an e2e encrypted media headers that are integrity protected. In this example, an encrypted data packet (e.g., a media data packet) may be transmitted by the client device(s) 202. The 4-tuple associated with the XDP/eBPF application 114 of the XDP layer included within an ingress pod 234 may determine whether the XDP/eBPF application 114 already knows of the data flow associated with the manner in which the encrypted data packet is to be processed. The ingress pod 234 may include a media switch application 206, a kernel space 102, an eBPF map database 116, a network stack 138, and a TEE enclave 126. For an initial encrypted data packet, the determination may return false since the XDP/eBPF application 114 may not know how to process the encrypted data packet. The XDP/eBPF application 114 of the XDP layer may pass up these initial packets to the application layer (e.g., the network sockets 106 of the socket layer) of the ingress pod 234. In one example, the XDP/eBPF application 114 of the XDP layer may pass up these initial packets to the application layer 218 of the application pod 216 for processing in a similar manner. In one example, the network stack 138 may further include an ethernet connection 214 to allow for communication via the IEEE 802 networking protocols.

The ingress pod 234 may inspect the encrypted data packet and classify the encrypted data packet. Inspection and classification of the encrypted data packet may include validation of a header of the encrypted data packet. In one example, the transport protocol may include a real time protocol (RTP) where the RTP header integrity may be verified using a hbh key of the encrypted data packet of a media stream. Validation may be performed for any encrypted RTP header extensions by decrypting the encrypted RTP header extensions using the hbh key.

Inspection and classification of the encrypted data packet may also include forwarding the encrypted data packet to a corresponding media services pod of a plurality of media services pods 228-1, 228-2, . . . 228-N where N is any integer greater than or equal to 1 (collectively referred to herein as media services pods 228 unless specifically addressed otherwise). As depicted in FIG. 2, the media services pods 228 form a replica set 226 of the Kubernetes cluster(s) 204 of the computing environment 200.

The ingress pod 234 may also generate a dynamic eBPF map for storage in the eBPF map database 116 for each media stream included as part of the teleconferencing instance. The eBPF map may include at least one of the source device (e.g., client device(s) 202), a destination tuple (e.g., a source IP, a port of remote side from where the encrypted data packet is received, a destination pod IP, a destination pod port on ingress, etc.), and combinations thereof. In one example where the encrypted data packets include RTP data streams, an RTP SSRC (e.g., rtp.ssrc field in a UDP packet payload) may be included within the RTP header. The SSRC may, in turn, identify a unique media source (e.g., audio channels, video channels, presentation video channels, application data channels, other channels and their associated protocols and data, etc.). The SSRC may be used to identify the source of the media stream and map the source to a unique data stream including any of the audio channels, video channels, presentation video channels, application data channels, other channels and their associated protocols and data, etc. As the data packets flow through the computing environment 200, the TA 128 may map a pod instance ID to a unique SSRC and an IP and/or port on the respective media services pods 228 to which the encrypted data packet is to be forwarded.

In one example where the encrypted data packets do not include RTP streams, the mapping may include the 4-tuple mapped to the pod instance ID. The pod instance ID may be mapped to each data channel associated with the encrypted data packet. For example, BFCP channel may be mapped to a first media services pod 228, and an iX channel may be mapped to another media services pod 228 for a given session of the teleconferencing instance. In these examples, the data packets may likely be encrypted, and the provisioning of TAs 128 during the signaling when a conference bridge is created. When the conference bridge is created the various channels are setup for a conferencing instance, and the source IP and destination IP as negotiated when the channels were set up. In this manner, an application may know that when a data packet comes from a source, the data packet is a particular instance of a type of data packet. For example, when a data packet is received from source A, the application may know that data packet is, for example, a particular instance of an audio data packet. Similarly, when a data packet comes from, for example, source B, the application may know that data packet is, for example, a particular instance of a video data packet. Other data packets of different types may be similarly processed. In this manner, the destination is identified and stored as an eBPF record in the eBPF map database 116. This eBPF record within the eBPF map database 116 may include the 4-tuple as a key. As an example, The 4-tuple associated with the XDP/eBPF application 114 of the XDP layer may also initialize a dynamic TA function in the TEE enclave 126 (e.g., such as the TEE enclave 126 of the TEE infrastructure 100 of FIG. 1) and provide a TEE handle to the eBPF map stored in the eBPF map database 116. The TA 128 may validate the RTP header, decrypt header extensions, and validate datagram transport layer security (DTLS) packets in examples where non-RTP data streams are being processed.

The eBPF recorded with the above details will be committed to the eBPF map stored within the eBPF map database 116 and indexed using the 4-tuple and SSRC as the key. In one example where non-RTP media streams are transmitted, the 4-tuple may be used as the eBPF key for record lookup within the eBPF map database 116.

In one example, all data packets may not be forwarded directly from the kernel to the destination, but the data packets may be selectively forwarded. For example, in a teleconferencing scenario, a number of control data packets may be multiplexed with, for example, audio RTP data packets. Media control packets such as, for example, session traversal utilities for network address translator (NAT) (STUN) and/or interactive connectivity establishment (ICE) data packets may be passed all the way up to the application layer (e.g., the network sockets 106 of the socket layer) so the media control packets may be processed via an ingress application layer. In this manner, selective packets on the same media flow (e.g., the same 4-tuple) may be forwarded via an application path described above in connection with FIG. 1 where as other data packets may be express routed directly from kernel space 102 to a destination pod (e.g., media services pod 228) as described in connection with FIG. 2. For subsequent data packets in the session, the XDP layer 4-tuple defined by the XDP/eBPF application 114 may look up in the eBPF map database 116 the 4-tuple on which the data packet is received, and apply the eBPF map rules defined for that 4-tuple to forward the data packets directly from the kernel space 102. For example, for RTP-based data streams, the XDP/eBPF application 114 may utilize the RTP SSRC (e.g., rtp.ssrc field in a UDP packet payload) value and forward the data packet to the pod instance based on the SSRC and pod instance mapping in the eBPF map rules defined for that 4-tuple. In contrast, in one example where non-RTP based data streams, the UDP and/or DTLS may be detected based on first few bits and the XDP/eBPF application 114 will again use the eBPF map rules to forward the data packet to the corresponding pod instance.

In one example, the XDP layer may periodically authenticate and/or validate the encrypted data packets in a given media stream instance. For example, every tenth encrypted data packet may be forwarded directly by the XDP kernel 4-tuple of the XDP/eBPF application 114 to the TA 128 using a TA handle from the corresponding eBPF map stored within the eBPF map database 116. In one example, the authentication and/or validation of the encrypted data packets may be performed in a randomized manner in order to avoid third party attacks including the transmission of invalid data packets. In this manner, the XDP/eBPF application 114 may periodically validate the encrypted data packets and sanitize the flow before forwarding to a corresponding media services pod 228. The TA 128 may validate the encrypted data packet based on media type, and in examples where the RTP packet is processed, the TA 128 may validate integrity of a header of the encrypted data packet. In this manner, the eBPF maps stored within the eBPF map database 116 may be periodically sanitized and revalidated in a manner similar to the way in which a cache is not retained beyond a predetermined time period. The sanitization and revalidation of the eBPF maps stored within the eBPF map database 116 may be performed based on a security policy defined at deployment. The security policy may define how often the cache is flushed and revalidated and may be defined by an administrator or other individual that defines the security policy.

In one example, other non-RTP streams such as, for example, presentation streams and/or application streams may share the entire payload. In this example, the entire payload may be encrypted inside a UDP/DTLS channel. The XDP/eBPF application 114 may detect that the data packet transmitted via the UDP/DTLS channel is a dTLS packet in the UDP payload by looking at first few bits of the payload. The XDP/eBPF application 114 may lookup the eBPF map within the eBPF map database 116 using the 4-tuple, and send the initial data packets to the TA 128 in the TEE enclave 126. The TA 128 in the TEE enclave 126 may decrypt the data packet, validate the data packet and/or the sender identity, and find the associated media services pod 228 to which the data packet should be sent. The TA 128 may send the information obtained in this process back to the XDP/eBPF application 114. The XDP 4-tuple in the NIC of the XDP/eBPF application 114 may cache the information obtained by the TA 128 in this process, and subsequent data packets on that DTLS session may be sent to the same media services pod 228 directly from the NIC driver itself. Further, as described above, the XDP/eBPF application 114 may periodically validate the data packets in the session using the TA 128 in the TEE enclave 126.

Scenario 2:

As to a second scenario, in one example, the endpoints (e.g., client device(s) 202) may utilize multiplexing. In this example, the computing environment 200 may utilize a single 4-tuple for all media channels. Thus, in this example, the client device(s) 202 may use only one 4-tuple and may send all media channels such as, for example, the audio data channel(s), the video data channel(s), and the application data channel(s), etc. and application data such as, for example, SCTP data, and BFCP data, etc. via the single 4-tuple. In this example, the eBPF map stored within the eBPF map database 116 may be generated in a different manner with respect to the method described above. In this example, in order to improve scalability of, for example, a teleconferencing or videoconferencing instance, wherein a single connection is utilized to send the audio data channel(s), the video data channel(s), and the application data channel(s), etc. and the application data (e.g., SCTP data, and BFCP data, etc.) in a multiplexed manner. This example may therefore follow any multiplexing and demultiplexing standards that may be applied. Even though these data streams may share the same connection in a multiplexed manner, it is still required that each channel or application data type maintain separate and unique identifications such as separate SSRC identifier to allow for multiplexing and subsequent demultiplexing to occur and to allow for each channel or application data type to be separately processed by separate media services pods 228.

Thus, in this example, an ingress pod (e.g., a media services pod 228) may generate a dynamic eBPF map as mentioned above in connection with Scenario 1. In one example, several data may be included in the eBPF map when the eBPF map is created. For example, eBPF map may include the source and destination tuple including, for example, the source IP, port of remote side from where the data packet is received, the destination pod IP of the media service pods 228, and the destination pod port on ingress, etc. Further, the eBPF map may include the RTP SSRC (e.g., the rtp.ssrc field in the UDP packet payload) that is present in RTP header. The SSRC may, in turn, identify the unique media source such as the audio data channel(s), the video data channel(s), and the application data channel(s), etc. The eBPF map may further include the pod instance ID mapped to the unique SSRC and IP/port for a particular media services pod 228 to which the data packet is to be forwarded. Even though all of the RTP streams sent to the media services pods 228 form a replica set 226 of the Kubernetes cluster(s) 204 are multiplexed (muxed) using the same 4-tuple, these RTP streams each include respective unique SSRC identifiers added to the eBPF map to assist in routing the RTP streams via an XDP route to an intended and correct media services pod 228 instance based on the SSRC identifiers. In applying the above, a set of data packets may be forwarded to the TA 128. The TA 128 may then identify the SSRC identifiers within the RTP headers of the set of data packets. Based on the SSRC identifiers, the TA 128 may send individual data packets to a respective one of the media services pods 228 based on the SSRC identifiers discovered in the data packets. Further, the TA 128 may record in the eBPF map database 116 information regarding the individual data packets and to which of the media services pods 228 the individual data packets were sent. This allows for subsequent processing to occur more quickly by reference to the eBPF map database 116. Thus, the XDP/eBPF application 114 located at the XDP layer may more directly transmit incoming data packets to the appropriate media services pods 228 based on the data stored in the eBPF map database 116.

In one example, XDP/eBPF application 114 located at the XDP layer and/or the TA 128 may demultiplex incoming data packets based on the information included within the RTP headers, and map, for example, an audio stream or channel to a first media services pod 228, a video stream or channel to a second media services pod 228, an application data stream or channel to a third media services pod 228 and control data packets to a fourth media services pod 228 in order to allow for the replica set 226 of the Kubernetes cluster(s) 204 to process these different services in an effective manner. This division of services via the interaction between the media switch application 206, the TEE enclave 126, the client device(s) 202, and the Kubernetes cluster(s) 204 in this manner may be applied to any of the examples described herein.

In an example of scenario 2 where non-RTP streams are being transmitted within the computing environment 200, the initial bits of the data packet may be used to detect if the data packet is a DTLS packet or a non-DTLS, and a corresponding ID for a media services pod 228 instance may be mapped using the ID obtained from the initial bits of the data packet. For example, a first data packet utilizing iX over DTLS may be mapped to a first media services pods 228, while a second data packet utilizing BFCP over UDP may be mapped to a second media services pods 228.

In one example, the XDP kernel 4-tuple of the XDP/eBPF application 114 may initialize a dynamic TA function in the TEE enclave 126 and may provide the TEE handle to the eBPF map stored in the eBPF map database 116. The records within the map database 116 in this example may include the source and destination tuple including, for example, the source IP, port of remote side from where the data packet is received, the destination pod IP of the media service pod 228, and the destination pod port on ingress, etc., the RTP SSRC (e.g., the rtp.ssrc field in the UDP packet payload) that is present in RTP header, and the pod instance ID mapped to the unique SSRC and IP/port for a particular media services pod 228 to which the data packet is to be forwarded as described above. This data may be committed to the eBPF map stored within the eBPF map database 116 and indexed using 4-tuple as the key.

Further, in the example of scenario 2 where non-RTP streams are being transmitted, for subsequent data packets the XDP/eBPF application 114 located at the XDP layer may lookup the eBPF map stored within the eBPF map database 116 using the 4-tuple of the received data packet. In this manner, the XDP/eBPF application 114 may obtain the eBPF record and apply the following rules. If the data packet is an RTP data packet, then the XDP/eBPF application 114 may use the RTP SSRC value and find the media service pod 228 instance to which to forward the data packet based on the information included in the eBPF map stored within the eBPF map database 116. The XDP/eBPF application 114 may then forward the data packet to the media service pod 228 instance identified in the eBPF map.

If the data packet is a DTLS packet, then the XDP/eBPF application 114 will forward the data packet to the media service pod 228 that handles DTLS streams. Further, if the data packet is a non-DTLS data packet such as, for example, a BFCP data packet transmitted over a BFCP application data channel, then the XDP/eBPF application 114 may forward the non-DTLS data packet to the corresponding media service pod 228 that handles non-DTLS streams.

In some examples, the computing environment 200 may processes QUIC-based transport payloads. As mentioned above, QUIC transport protocol supports multiplexing. QUIC is a general-purpose transport layer network protocol improves performance of connection-oriented web applications that utilize TCP by establishing a number of multiplexed connections between two endpoints using UDP. QUIC functions with hypertext transfer protocol (HTTP)/2 and HTTP/3. QUIC transport protocol is designed such that it inherently supports multiplexing and e2e encryption. The QUIC header exposes a connection identifier (e.g., ConnectionID) in a public header which does not have any additional information including private information or other information a user does not wish others to view. The use of ConnectionID in a public header further prevents linkability of connections across deliberate address migrations by providing protected communications between a client device and a server. However, avoiding linkability of migrated connections via the use of ConnectionID creates issues for load-balancing intermediaries within the computer environment. In one example, the required information such as a Server ID in the ConnectionID may be provided so that a load balancing device may de4-tuple and ensure the session affinity. As the ConnectionID is en4-tupled, until required key is available with XDP programs at a MC driver layer, it cannot get any useful information out of this ConnectionID tuple alone unless it has application awareness.

In the example of QUIC-based transport payloads, the QUIC header may expose only the ConnectionID in a public header of the data packet. This ConnectionID is also meant to prevent linkability of connections across deliberate address migration. Avoiding linkability in ConnectionID of migrated connections creates issues for load-balancing intermediaries, for example. The present systems and methods encode the required info such as a server ID in the ConnectionID so that a load balancer may decode and ensure the target server for session affinity. This QUIC-based transport seamlessly caters to ConnectionID migrations. As QUIC is officially an HTTP/3 enabled there an increasing number of cloud applications may be moving to QUIC-based communications. If the load balancing decision is to be moved to the XDP/eBPF application 114 located at the XDP layer for latency sensitive and session affinity demanding applications, then the XDP/eBPF application 114 may be required to decode the ConnectionID to identify the server ID.

The present systems and methods identify the QUIC traffic, and filter and add the only ConnectionID field in the eBPF map which the TA assistant 120 selects. The XDP/eBPF application 114 of the kernel space 102 invokes the respective TA 128. The result including the underlying server ID may be added back on the eBPF map stored within eh eBPF map database 116. The XDP/eBPF application 114 may use this for efficient load balancing requirements. The data obtained in this process may be cached in associating with the eBPF map stored within eh eBPF map database 116 in order for the flow and load balancing decision to be made quickly by the XDP/eBPF application 114 at the XDP layer.

Turning again FIG. 2, the Kubernetes cluster(s) 204 of the computing environment 200 may, in addition to the media services pod 228, include a first media switch 230 and a second media switch 232. In one example, the media switch application 206, which may be executed at any computing device described herein such as the client device(s) 202 may communicate with the Kubernetes cluster(s) 204 via the first media switch 230. The first media switch 230 may have a public IP address and may be referred to as a media switch public IP pod. The data processed as described above and transmitted to the Kubernetes cluster(s) 204 via the first media switch 230 may be processed via the elements of the client device(s) 202, the TEE enclave 126, and the media switch application. Once the data packets are processed and transmitted to the first media switch 230 as segregated data packets or streams where the XDP/eBPF application 114 located at the XDP layer and/or the TA 128 may demultiplex incoming data packets based on the information included within the RTP headers, and map, for example, an audio stream or channel to a first media services pod 228, a video stream or channel to a second media services pod 228, an application data stream or channel to a third media services pod 228 and control data packets to a fourth media services pod 228 in order to allow for the replica set 226 of the Kubernetes cluster(s) 204 to process these different services in an effective manner. The media services pod 228 may then send the processed data to a host NIC card 224 for distribution to, for example, client device(s) 202 or other networked devices.

In one example, a TEE enclave 126 may be communicatively coupled to an application pod 216 of the Kubernetes cluster(s) 204 via the second media switch 232. The second media switch 232 may be referred to as a media switch ingress pod and communicates directly between the TEE enclave 126 and the host NIC card 224, an eBPF layer 222, an inter-container workload manager 220, and an application layer 218 included within the application pod 216 of the Kubernetes cluster(s) 204. With this direct communication between the TEE enclave 126 and the application pod 216, the TA 128 of the TEE enclave 126 may transmit a number of initial data packets to the application pod 216 via the second media switch 232. The application pod 216 may classify the data packet and insert application code (e.g., the TA 128) into the TEE enclave 126 for RTP header lookup and validation processing as described herein. Further, the application pod 216 may In one example, the inter-container workload manager 220 may provide management resources for Kubernetes networking and security to obtain better data processing performance and scalability within the Kubernetes cluster(s) 204. In one example, the inter-container workload manager 220 may include the CILIUM open source container network interface (CNI) plugin, and may provide including identity-aware security, multi-cluster routing, transparent encryption, API-aware visibility/filtering, and service-mesh acceleration, among other services.

The application layer 218 of the application pod 216 may process media control packets or other data packets such that selective packets on the same media flow (e.g., the same 4-tuple) may be forwarded via an application path described above in connection with FIG. 1 while other data packets may be express routed directly from kernel space 102 to a destination pod (e.g., media services pod 228) as described herein. In one example, a user may require access to the application layer 218 (e.g., Layer 7 or L7) headers in order to be able to classify and route data packets properly. For example, the application layer 218 may perform the demultiplexing and/or classification of data packets including data packets associated with the audio data channel(s), video data channel(s), application data channel(s), etc.

The eBPF layer 222 may be located at an XDP layer of the application pod 216, and may include an XDP/eBPF application similar to the XDP/eBPF application 114 of the kernel space 102 in order to access eBPF kernel hooks. As described herein, access to the eBPF kernel hooks allows for the application pod 216 to glean intelligence regarding data packet forwarding decisions.

In one example, the elements of the TEE infrastructure 100 of FIG. 1 and/or the computing environment 200 of FIG. 2 may be included within a single computing device or computing environment. In one example, a number of the elements of the TEE infrastructure 100 of FIG. 1 and/or the computing environment 200 of FIG. 2 may be distributed among a number of computing devices or computing environments.

Figure 3:
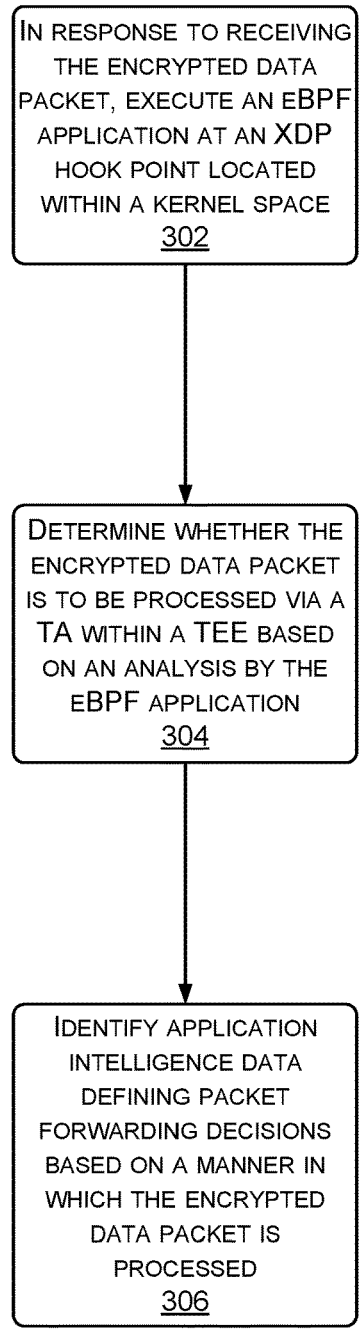
FIG. 3 illustrates a flow diagram of an example method of transmitting an encrypted data packet, according to an example of the principles described herein.

Having described the various elements of the TEE infrastructure 100 of FIG. 1 and/or the computing environment 200 of FIG. 2, FIG. 3 illustrates a flow diagram of an example method 300 of transmitting an encrypted data packet, according to an example of the principles described herein. The method 300 of FIG. 3 may be implemented by a processor included within the hardware 122 such as the CPU 124 or other processing device described herein. The method 300 may include, in response to receiving an encrypted data packet, executing 302 an extended Berkeley packet filter (eBPF) application 114 at an express data path (XDP) hook point located within a kernel space 102. The method 300 may also include determining 304 whether the encrypted data packet is to be processed via a trusted application (TA) 128 within a trusted execution environment (TEE) 126 based on an analysis by the eBPF application 114.

At 306, the method 300 may include identifying application intelligence data defining packet forwarding decisions based on a manner in which the encrypted data packet is processed. As described herein, this application intelligence data defining packet forwarding decisions may be stored within the eBPF map database 116 accessible by the TA assistant 120, the TA 128, the client device(s) 202, the media switch application 206, the application pod 216 and other computing elements described herein.

Figure 4:
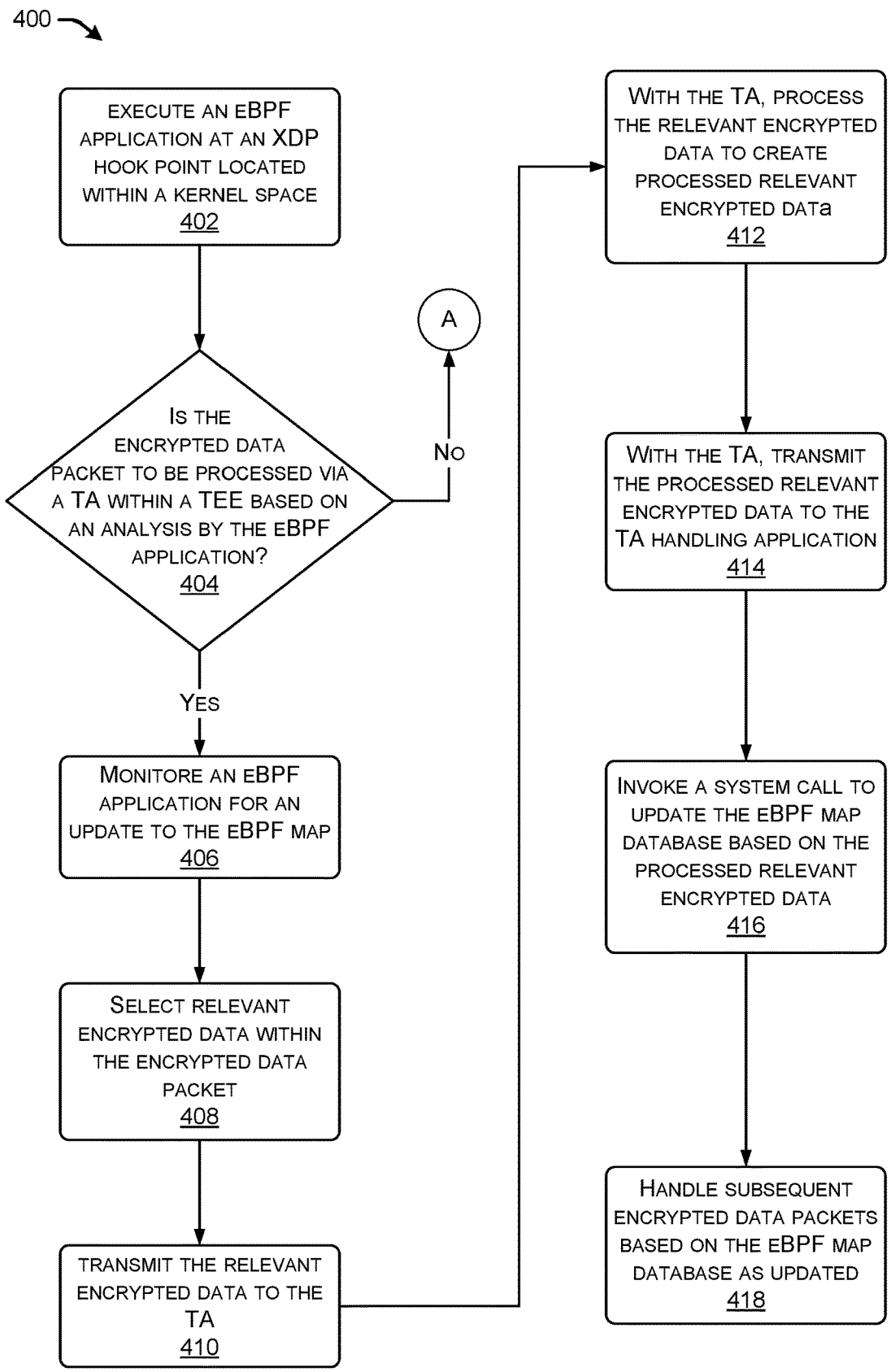
FIGS. 4 and 5 illustrates a flow diagram of an example method of transmitting an encrypted data packet, according to an example of the principles described herein.
Figure 5:
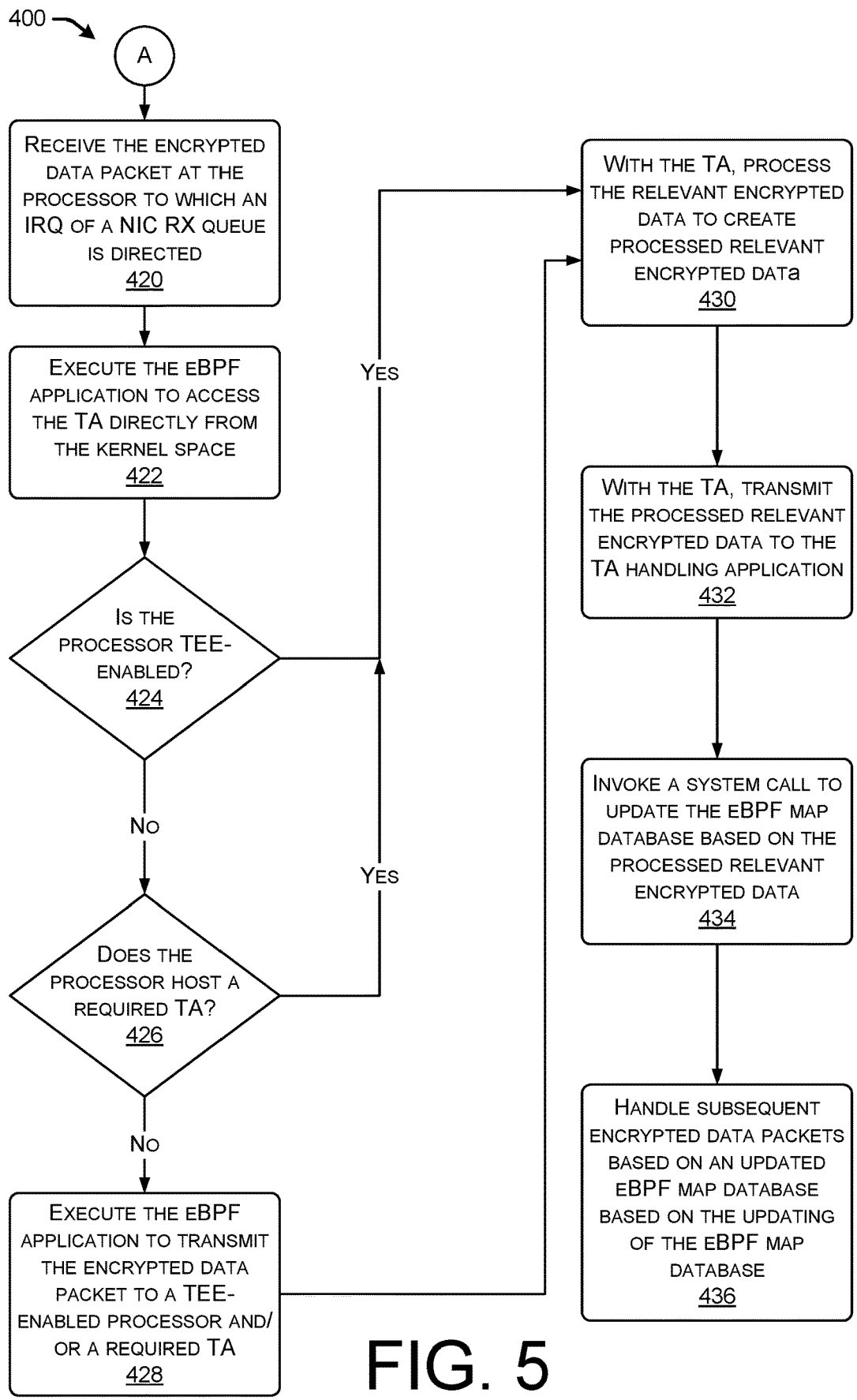

FIGS. 4 and 5 illustrates a flow diagram of an example method 400 of transmitting an encrypted data packet, according to an example of the principles described herein. FIGS. 4 and 5 include a call flow indicator designated as "A" to show how the method 400 proceeds between FIGS. 4 and 5. The method 400 may include, at 402, executing an eBPF application (e.g., the XDP/eBPF application 114) at an XDP hook point located within the kernel space 102. As mentioned herein, the TEE infrastructure 100 may utilize an XDP layer to access eBPF kernel hooks in order to glean intelligence regarding data packet forwarding decisions. eBPF is a powerful in-kernel byte4-tuple engine which allows full programmability on inserting hooks in all logical points of a kernel stack in order to handle the data packets. The ability of eBPF processing to allow full programmability on inserting the hooks in all logical points of a kernel stack to handle the networking packets further allows the eBPF processing to interpret system call events and take any logical action. In one example, a hook may include an earliest point possible within a networking driver located at the XDP layer and may trigger a run of an eBPF program upon data packet reception. This achieves the best possible data packet processing performance since the program runs directly on the data packet before any other processing may occur. The hook provides for the running of filtering programs that drop malicious or unexpected traffic, as well as allows for the forwarding of data packets based on the present systems and methods. In one example, the hook may be placed in a NIC driver just after interrupt processing and before any memory allocation needed by the network stack 138 because memory allocation can be an expensive operation.

At 404, the XDP/eBPF application 114 may determine whether the encrypted data packet to be processed via a TA 128 within the TEE enclave 126. This determination may be based on an analysis by the eBPF application (e.g., the XDP/eBPF application 114) at the XDP hook point of the XDP layer located within the kernel space 102. As indicated in FIG. 4, if the encrypted data packet is to be processed via a TA 128 within the TEE enclave 126 (based on the analysis from the XDP/eBPF application 114 (404, determination YES), then the method proceeds to 406. If, however, the encrypted data packet is not to be processed via a TA 128 within the TEE enclave 126 (404, determination NO), then the method proceeds to call flow indicator "A" and 420 of FIG. 5.

As to the determination that the encrypted data packet is to be processed via a TA 128 within the TEE enclave 126 (based on the analysis from the XDP/eBPF application 114) (404, determination YES), at 406, the TA assistant 120 may monitor the XDP/eBPF application 114 for an update to the at least one eBPF map stored in the eBPF map database 116. The TA assistant 120 may, at 408, select relevant encrypted data within the encrypted data path. At 410, the TA assistant 120 may transmit any relevant encrypted data to the TA 128 within the TEE enclave 126. The TA assistant 120 at 406 through 410 processes the eBPF data structure, identifies the underlying application type, extracts the encrypted portion of the encrypted data packet to be processed from the eBPF map database 116, and invokes the appropriate TA 128 in the TEE enclave 126 with the filtered data. Thus, at 406 through 410, when the encrypted data packet is received (e.g., at 140 of FIG. 1), the eBPF application at the gets triggered at the XDP layer including a number of eBPF kernel hooks. Filtering criteria may be applied by the eBPF application to the encrypted data packet to identify an encrypted data packet that is to be further processes via the TA 128. If the filtering criteria identifies the encrypted data packet is to be further processed via the TA 128, the XDP/eBPF application 114 executed at the XDP layer of the network stack 138 may update the eBPF map database 116 with all relevant information including, for example, a map type including a data structure identifying an application type and an encrypted portion of the encrypted data packet. The identification of interesting traffic may be based at least in part on, for example, a processing of a number of initial packets to identify in instances where the TA 128 has been pre-installed, whether the initial packets have been transmitted to the TA handling application which triggers the updating of the eBPF map database, and combinations thereof.

The TA 128 may, at 412, process the relevant encrypted data to create processed relevant encrypted data 412. At 414, the TA 128 may transmit the processed relevant encrypted data to the TA handling application (e.g., the TA assistant 120). At 416, a system call may be invoked by the XDP/eBPF application 114, the TA assistant 120 or the TA 128 to update the eBPF map stored in the eBPF map database 116. Updating the eBPF map may be performed based on the processed relevant encryption data. The TA assistant 120 may update the eBPF map database 116 with the result by invoking an eBPF SYSCALL. Thus, when the XDP/eBPF application 114 receives an encrypted data packet, the XDP/eBPF application 114 may select the updated information within the eBPF map database 116, and process or handle the encrypted data packet based on how the previous encrypted data packet was handled. Thus, at 418, subsequent encrypted data packets may be handled within the TEE infrastructure 100 and/or the computing environment 200 based on the updated eBPF map database 116.

Returning to 404, if the encrypted data packet is not to be processed via a TA 128 within the TEE enclave 126 (based on the analysis from the XDP/eBPF application 114) (404, determination NO), then the method proceeds to 420 of FIG. 5 via call flow indicator "A." At 420, the encrypted data packet may be received at a processor (e.g., a CPU referred to as the "receiving CPU") to which an IRQ of a NIC RX queue is directed. This receiving CPU is the CPU that initially receives the encrypted data packet, and it is at this point where the XDP program of the XDP/eBPF application 114 is executed for initial packet filtering. At 422 the XDP/eBPF application 114 may be executed to access the TA 128 directly from the kernel space 102.

At 424, it may be determined whether the receiving processor within the hardware 122 such as the CPU 124 is TEE-enabled as described herein. Further, at 426, it may be determined whether the receiving processor hosts a required TA 128. In response to a determination that the receiving processor is not TEE-enabled (424, determination NO) and/or that the processor does not host the required TA 128 (426, determination NO), the XDP/eBPF application 114 may be executed to transmit the encrypted data packet to a TEE-enabled processor and/or to a processor that hosts the required TA 128 at 428. In one example, the TEE-enabled processor the processor that hosts the required TA 128 may be located remote from the kernel space 102, the user space 118, and/or the hardware 122. The encrypted data packet may be processed at that remote processor and returned to the native or original TEE infrastructure 100 and/or computing environment 200.

If, instead, it is determined that that the receiving processor is TEE-enabled (424, determination YES) and/or that the processor does host the required TA 128 (426, determination YES), the relevant encrypted data may be processed with the TA 128 to create processed relevant encrypted data at 430. At 432, the TA 128 may transmit the processed relevant encrypted data to the TA handling application (e.g., the TA assistant 120).

At 434, the TA assistant 120 and/or the XDP/eBPF application 114 may invoke a system call to update the eBPF map databased based on the processed relevant encrypted data in order to effect how subsequent encrypted data packets are handled. The TA assistant 120 and/or the XDP/eBPF application 114 may update the eBPF map database 116 with the result by invoking an eBPF SYSCALL. Further, at 436, the TEE infrastructure 100 and/or the computing environment 200 may handle subsequent encrypted data packets based on the updated eBPF map database 116 based on the updating of the eBPF map database 116 at 434. Thus, when the XDP/eBPF application 114 receives an encrypted data packet, the XDP/eBPF application 114 may select the updated information within the eBPF map database 116, and process or handle the encrypted data packet based on how the previous encrypted data packet was handled. Thus, as more and more application intelligence data defining packet forwarding decisions is obtained from previous processing decisions, for many of the encrypted data packets received at the XDP/eBPF application 114 it may not be required to process every one anew since that information is provided within the XDP/eBPF application 114. If an initial few encrypted data packets are analyzed to determine the flow, then the required treatment will be applied to subsequent encrypted data packets based thereon.

Figure 6:
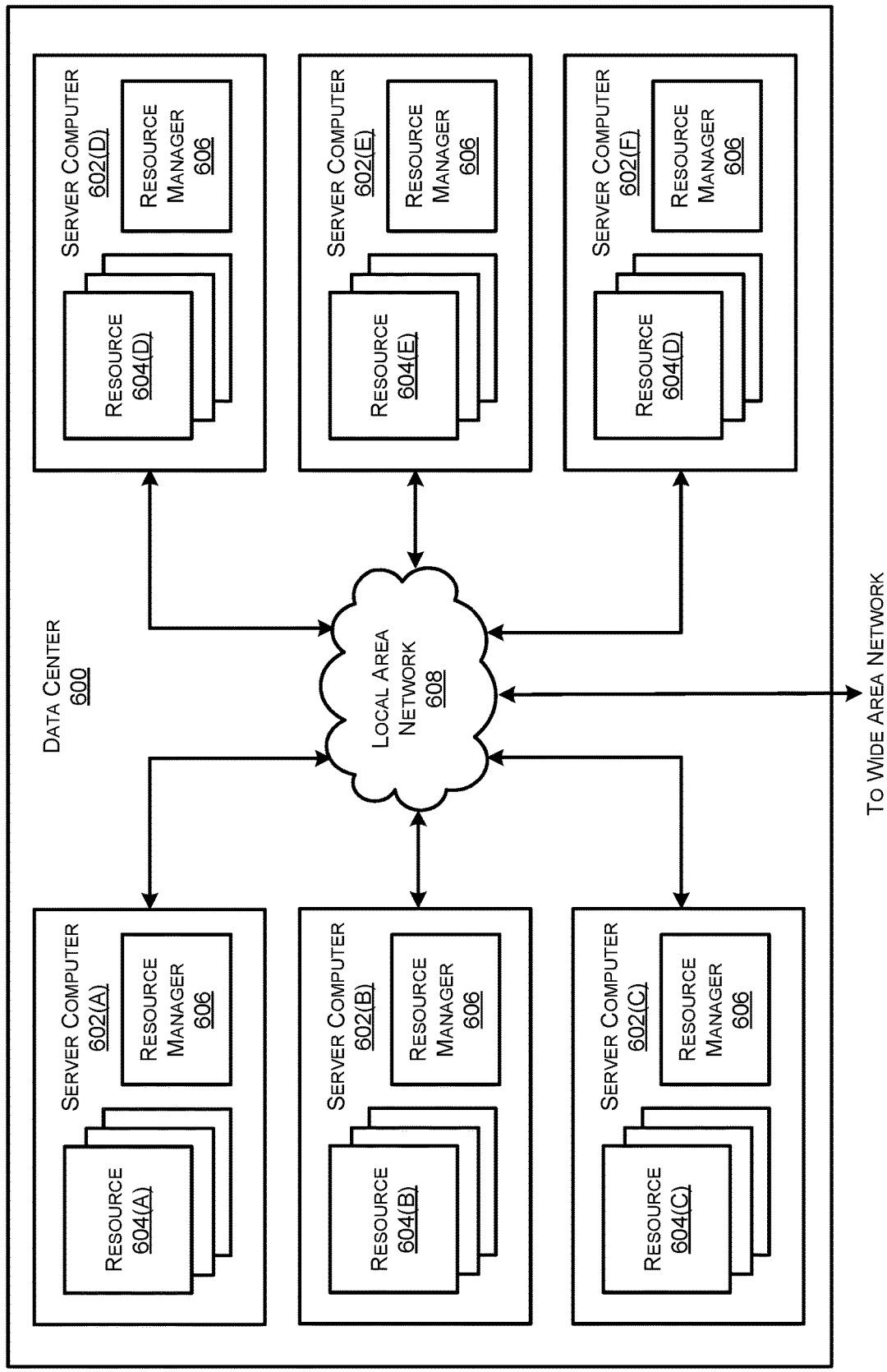
FIG. 6 illustrates a computing system diagram illustrating a configuration for a data center that may be utilized to implement aspects of the technologies disclosed herein.

FIG. 6 illustrates a computing system diagram illustrating a configuration for a data center 600 that may be utilized to implement aspects of the technologies disclosed herein. The example data center 600 shown in FIG. 6 includes several server computers 602A-602F (which might be referred to herein singularly as "a server computer 602" or in the plural as "the server computers 602) for providing computing resources. In some examples, the resources and/or server computers 602 may include, or correspond to, any type of networked device described herein. Although described as servers, the server computers 602 may comprise any type of networked device, such as servers, switches, routers, hubs, bridges, gateways, modems, repeaters, access points, etc.

The server computers 602 may be standard tower, rackmount, or blade server computers configured appropriately for providing computing resources. In some examples, the server computers 602 may provide computing resources 604 including data processing resources such as VM instances or hardware computing systems, database clusters, computing clusters, storage clusters, data storage resources, database resources, networking resources, virtual private networks (VPNs), and others. Some of the server computers 602 may also be configured to execute a resource manager 606 capable of instantiating and/or managing the computing resources. In the case of VM instances, for example, the resource manager 606 may be a hypervisor or another type of program configured to enable the execution of multiple VM instances on a single server computer 602. Server computers 602 in the data center 600 may also be configured to provide network services and other types of services.

In the example data center 600 shown in FIG. 6, an appropriate LAN 608 is also utilized to interconnect the server computers 602A-602F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 600, between each of the server computers 602A-602F in each data center 600, and, potentially, between computing resources in each of the server computers 602. It may be appreciated that the configuration of the data center 600 described with reference to FIG. 6 is merely illustrative and that other implementations may be utilized.

In some examples, the server computers 602 and or the computing resources 604 may each execute/host one or more tenant containers and/or virtual machines to perform techniques described herein.

In some instances, the data center 600 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 604 provided by the cloud computing network may include various types of computing resources, such as data processing resources like tenant containers and VM instances, data storage resources, networking resources, data communication resources, network services, VPN instances, and the like.

Each type of computing resource 604 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 604 not mentioned specifically herein.

The computing resources 604 provided by a cloud computing network may be enabled in one example by one or more data centers 600 (which might be referred to herein singularly as "a data center 600" or in the plural as "the data centers 600). The data centers 600 are facilities utilized to house and operate computer systems and associated components. The data centers 600 typically include redundant and backup power, communications, cooling, and security systems. The data centers 600 may also be located in geographically disparate locations. One illustrative example for a data center 600 that may be utilized to implement the technologies disclosed herein is described herein with regard to, for example, FIGS. 1 through 5.

Figure 7:
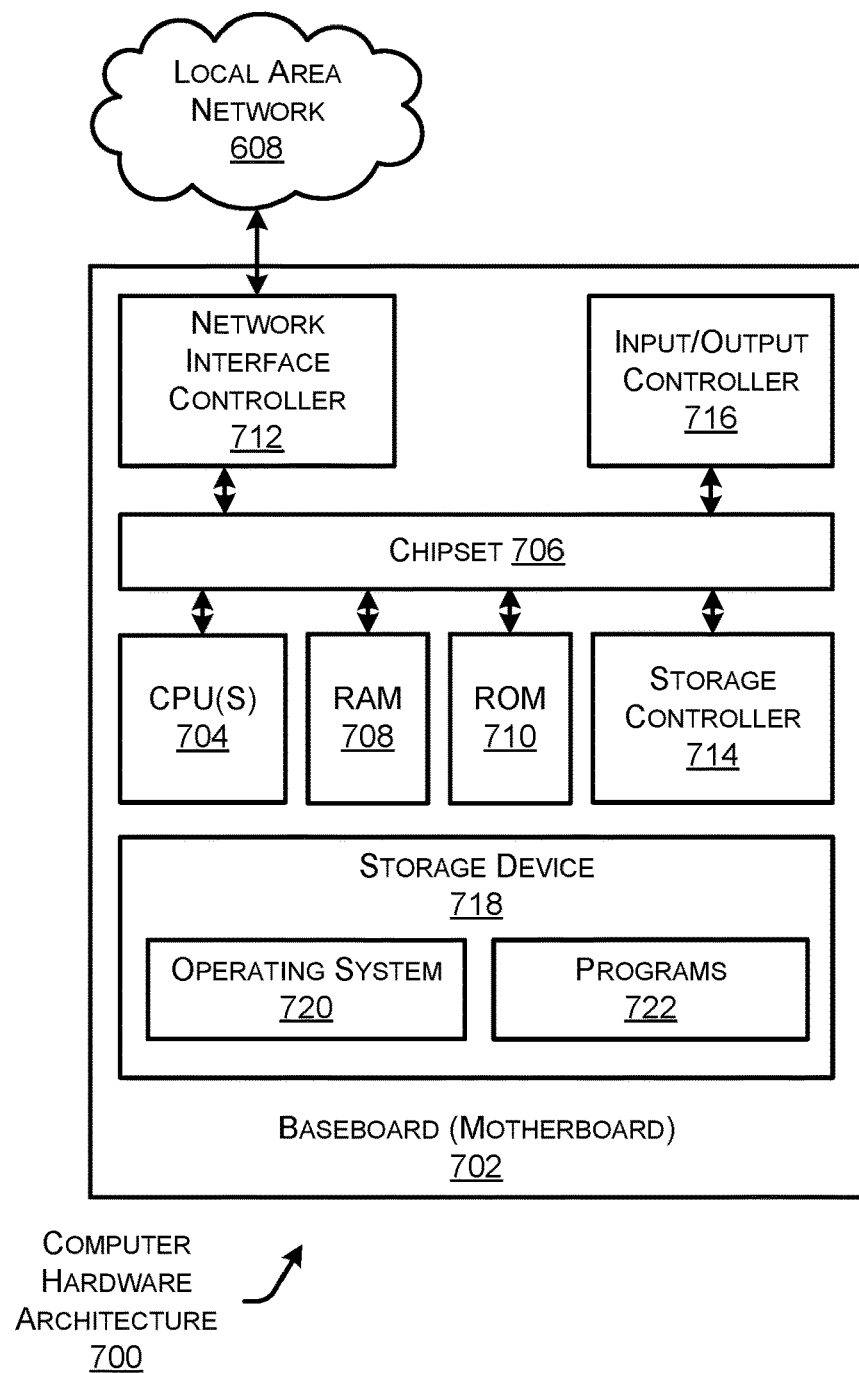
FIG. 7 illustrates a computer architecture diagram showing an example computer hardware architecture for implementing a computing device that may be utilized to implement aspects of the various technologies presented herein.

FIG. 7 illustrates a computer architecture diagram showing an example computer hardware architecture 700 for implementing a computing device that may be utilized to implement aspects of the various technologies presented herein. The computer hardware architecture 700 shown in FIG. 7 illustrates the kernel space 102, the user space 118, the hardware 122, the media switch application 206, the Kubernetes cluster(s) 204, portions thereof, combinations thereof, and/or other systems or devices associated with the TEE infrastructure 100 and/or the computing environment 200 and/or remote from the TEE infrastructure 100 and/or the computing environment 200, a workstation, a desktop computer, a laptop, a tablet, a network appliance, an e-reader, a smartphone, or other computing device, and may be utilized to execute any of the software components described herein. The computer 700 may, in some examples, correspond to a network device (e.g., the kernel space 102, the user space 118, the hardware 122, the media switch application 206, the Kubernetes cluster(s) 204 (and associated devices) described herein, and may comprise networked devices such as servers, switches, routers, hubs, bridges, gateways, modems, repeaters, access points, etc.

The computer 700 includes a baseboard 702, or "motherboard," which is a printed circuit board to which a multitude of components or devices may be connected by way of a system bus or other electrical communication paths. In one illustrative configuration, one or more central processing units (CPUs) 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a RAM 708, used as the main memory in the computer 700. The chipset 706 may further provide an interface to a computer-readable storage medium such as a read-only memory (ROM) 710 or non-volatile RAM (NVRAM) for storing basic routines that help to startup the computer 700 and to transfer information between the various components and devices. The ROM 710 or NVRAM may also store other software components necessary for the operation of the computer 700 in accordance with the configurations described herein.

The computer 700 may operate in a networked environment using logical connections to remote computing devices and computer systems through a network, such as the kernel space 102, the user space 118, the hardware 122, the media switch application 206, the Kubernetes cluster(s) 204, the TEE infrastructure 100, the computing environment 200, among other devices. The chipset 706 may include functionality for providing network connectivity through a Network Interface Controller (NIC) 712, such as a gigabit Ethernet adapter. The NIC 712 is capable of connecting the computer 700 to other computing devices within the TEE infrastructure 100 and/or the computing environment 200 and external to the TEE infrastructure 100 and/or the computing environment 200. It may be appreciated that multiple NICs 712 may be present in the computer 700, connecting the computer to other types of networks and remote computer systems. In some examples, the NIC 712 may be configured to perform at least some of the techniques described herein, such as packet redirects and/or other techniques described herein.

The computer 700 may be connected to a storage device 718 that provides non-volatile storage for the computer. The storage device 718 may store an operating system 720, programs 722 (e.g., any computer-readable and/or computer-executable 4-tuple described herein), and data, which have been described in greater detail herein. The storage device 718 may be connected to the computer 700 through a storage controller 714 connected to the chipset 706. The storage device 718 may consist of one or more physical storage units. The storage controller 714 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 700 may store data on the storage device 718 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 718 is characterized as primary or secondary storage, and the like.

For example, the computer 700 may store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the storage device 718 by detecting the physical states or characteristics of one or more particular locations within the physical storage units.

In addition to the storage device 718 described above, the computer 700 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 700. In some examples, the operations performed by the kernel space 102, the user space 118, the hardware 122, the media switch application 206, the Kubernetes cluster(s) 204, the TEE infrastructure 100, the computing environment 200, and/or any components included therein, may be supported by one or more devices similar to computer 700. Stated otherwise, some or all of the operations performed by the kernel space 102, the user space 118, the hardware 122, the media switch application 206, the Kubernetes cluster(s) 204, the TEE infrastructure 100, the computing environment 200, and/or any components included therein, may be performed by one or more computer devices operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 718 may store an operating system 720 utilized to control the operation of the computer 700. According to one example, the operating system 720 comprises the LINUX operating system. According to another example, the operating system comprises the WINDOWS® SERVER operating system from MICROSOFT Corporation of Redmond, Wash. According to further examples, the operating system may comprise the UNIX operating system or one of its variants. It may be appreciated that other operating systems may also be utilized. The storage device 718 may store other system or application programs and data utilized by the computer 700.

In one example, the storage device 718 or other computer-readable storage media is en4-tupled with computer-executable instructions which, when loaded into the computer 700, transform the computer from a general-purpose computing system into a special-purpose computer capable of implementing the examples described herein. These computer-executable instructions transform the computer 700 by specifying how the CPUs 704 transition between states, as described above. According to one example, the computer 700 has access to computer-readable storage media storing computer-executable instructions which, when executed by the computer 700, perform the various processes described above with regard to FIGS. 1 through 5. The computer 700 may also include computer-readable storage media having instructions stored thereupon for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, an input/output controller 716 may provide output to a display, such as a computer monitor, a flat-panel display, a digital projector, a printer, or other type of output device. It will be appreciated that the computer 700 might not include all of the components shown in FIG. 7, may include other components that are not explicitly shown in FIG. 7, or might utilize an architecture completely different than that shown in FIG. 7.

As described herein, the computer 700 may comprise one or more of the kernel space 102, the user space 118, the hardware 122, the media switch application 206, the Kubernetes cluster(s) 204, the TEE infrastructure 100, the computing environment 200, and/or other systems or devices associated with the TEE infrastructure 100, the computing environment 200 and/or remote from the TEE infrastructure 100, the computing environment 200. The computer 700 may include one or more hardware processor(s) such as the CPUs 704 configured to execute one or more stored instructions. The CPUs 704 may comprise one or more cores. Further, the computer 700 may include one or more network interfaces configured to provide communications between the computer 700 and other devices, such as the communications described herein as being performed by the kernel space 102, the user space 118, the hardware 122, the media switch application 206, the Kubernetes cluster(s) 204, the TEE infrastructure 100, the computing environment 200, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure for the kernel space 102, the user space 118, the hardware 122, the media switch application 206, the Kubernetes cluster(s) 204, the TEE infrastructure 100, the computing environment 200 as described herein. The programs 722 may enable the devices described herein to perform various operations.

CONCLUSION

The examples described herein enables an XDP layer with encrypted application awareness to make decision on forwarding the encrypted data packets without sharing the application centric keys to the kernel space 102. The systems and methods filter out interesting encrypted data packets or partially encrypted headers to process the data packets in a TA in a TEE infrastructure in order to glean intelligence through eBPF programming. In one example, the present systems and methods may use interim user space 118 and an associated TA assistant 120. In one example, the present systems and methods may use direct kernel based access.

The systems and methods described herein provide access to a correct or appropriate processing device (e.g., CPU 124) that is TEE-enabled and that hosts an intended TA 128 to offload the data packet decryption on a multi-processing or heterogenous system. Having flexible options to identify the interesting data packets in the XDP layer either by processing initial packets or sending the initial packets to get processed in user space to update the required TA 128 is also provided by the present systems and methods. For a media use case, a first few packets sent to app code such as the TA assistant 120 may add an eBPF map with some rules. The XDP layer and an associated XDP/eBPF application 114 may use an eBPF map to route subsequent data packets based on those rules. Periodically, the XDP/eBPF application 114 may validate packets via the TA 128 in the TEE enclave 126. The TA 128 use may also be set in the rules including defining that the TEE handle or TA identifier. In this manner, every data packet does not have to be validated by the TA 128 for RTP or app data over UDP such as DTLS, and may only be periodic and rest routed via eBPF rules directly to a destination pod.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A method of transmitting an encrypted data packet, comprising:
   providing, from a network device, a first encrypted data packet to a trusted application (TA) handling application located outside a trusted execution environment (TEE) of the network device;
   receiving, from the TA handling application, packet-forwarding data that defines processing instructions for the first encrypted data packet;
   in response to receiving a second encrypted data packet, executing an extended Berkeley packet filter (eBPF) application at an express data path (XDP) hook point located within a kernel space of the network device;
   analyzing the second encrypted data packet by the eBPF application; and
   determining that the second encrypted data packet is to be processed via a trusted application (TA) within the TEE based at least in part on the analyzing by the eBPF application and the processing instructions.

2. The method of claim 1, further comprising:
   in response to a determination that filtering criteria indicates additional processing via a trusted application (TA), updating an eBPF map database;
   with the TA handling application:
      monitoring the eBPF application for an update to the eBPF map database;
      selecting relevant encrypted data within the first encrypted data packet; and
      transmitting the relevant encrypted data to the TA;
   with the TA:
      processing the relevant encrypted data to create processed relevant encrypted data; and
      transmitting the processed relevant encrypted data to the TA handling application; and
   invoking a system call to update the eBPF map database based on the processed relevant encrypted data.

3. The method of claim 2, wherein the eBPF map database comprises a map type comprising a data structure identifying an application type and an encrypted portion of the first encrypted data packet.

4. The method of claim 2, wherein the determination that the filtering criteria indicates additional processing by the TA is based at least in part on a processing of initial packets to identify in instances where the TA has been pre-installed, is based at least in part on whether the initial packets have been transmitted to the TA handling application which triggers the updating of the eBPF map database, or combinations thereof.

5. The method of claim 1, wherein the first encrypted data packet comprises QUIC transfer protocol enabled traffic comprising an en4-tupled identifier and encoded ConnectionID.

6. The method of claim 1, wherein the first encrypted data packet comprises:
   real-time (RT) media traffic comprising real-time protocol (RTP) header data comprising a synchronization source identifier (SSRC),
   a plurality of multiplexed media channels transmitted via a quadruple, or
   combinations thereof.

7. The method of claim 2, further comprising handling subsequent encrypted data packets based on an updated eBPF map database based on the updating of the eBPF map database.

8. The method of claim 1, further comprising:
   receiving the first encrypted data packet at a processor of the network device to which an interrupt request (IRQ) of a network interface controller (NIC) receive (RX) queue is directed; and
   executing the eBPF application to access the TA directly from the kernel space.

9. The method of claim 8, further comprising:
   determining if the processor is TEE-enabled; and
   based at least in part on the processor not being TEE-enabled, executing the eBPF application to transmit the first encrypted data packet to a TEE-enabled processor.

10. The method of claim 9, wherein the eBPF application comprises an inventory of a TA installation status of a plurality of processors.

11. A computing device, comprising:
   a processor; and
   a non-transitory computer-readable media storing instructions that, when executed by the processor, causes the processor to perform operations comprising:
      providing, from a network device, a first encrypted data packet to a trusted application (TA) handling application located outside a trusted execution environment (TEE) of the network device;
      receiving, from the TA handling application, packet-forwarding data that defines processing instructions for the first encrypted data packet;
      in response to receiving a second encrypted data packet, executing an extended Berkeley packet filter (eBPF) application at an express data path (XDP) hook point located within a kernel space of the network device;
      analyzing the second encrypted data packet by the eBPF application; and
      determining that the second encrypted data packet is to be processed via a trusted application (TA) within the TEE based at least in part on the analyzing by the eBPF application and the processing instructions.

12. The computing device of claim 11, the operations further comprising:
in response to a determination that filtering criteria indicates additional processing via a trusted application (TA), updating an eBPF map database;
with the TA handling application:
monitoring the eBPF application for an update to the eBPF map database;
selecting relevant encrypted data within the first encrypted data packet; and
transmitting the relevant encrypted data to the TA;
with the TA:
processing the relevant encrypted data to create processed relevant encrypted data; and
transmitting the processed relevant encrypted data to the TA handling application; and
invoking a system call to update the eBPF map database based on the processed relevant encrypted data.

13. The computing device of claim 12, wherein the eBPF map database comprises a map type comprising a data structure identifying an application type and an encrypted portion of the first encrypted data packet.

14. The computing device of claim 12, wherein the determination that the filtering criteria indicates additional processing by the TA is based at least in part on a processing of initial packets to identify in instances where the TA has been pre-installed, is based at least in part on whether the initial packets have been transmitted to the TA handling application which triggers the updating of the eBPF map database, or combinations thereof.

15. The computing device of claim 11, wherein the first encrypted data packet comprises QUIC transfer protocol enabled traffic comprising an en4-tupled identifier and encoded ConnectionID.

16. The computing device of claim 11, wherein the first encrypted data packet comprises:
real-time (RT) media traffic comprising real-time protocol (RTP) header data comprising a synchronization source identifier (SSRC),
a plurality of multiplexed media channels transmitted via a quadruple, or
combinations thereof.

17. The computing device of claim 12, the operations further comprising handling subsequent encrypted data packets based on an updated eBPF map database based on the updating of the eBPF map database.

18. The computing device of claim 11, the operations further comprising:
receiving the first encrypted data packet at the processor to which an interrupt request (IRQ) of a network interface controller (NIC) receive (RX) queue is directed; and
executing the eBPF application to access the TA directly from the kernel space.

19. The computing device of claim 18, the operations further comprising:
determining if the processor is TEE-enabled; and
based at least in part on the processor not being TEE-enabled, executing the eBPF application to transmit the first encrypted data packet to a TEE-enabled processor.

20. The computing device of claim 19, wherein the eBPF application comprises an inventory of a TA installation status of a plurality of processors.

* * * * *